US012482336B2

(12) United States Patent
Kim et al.

(10) Patent No.: US 12,482,336 B2
(45) Date of Patent: Nov. 25, 2025

(54) ELECTRONIC DEVICE AND METHOD FOR OUTPUTTING HAPTIC FEEDBACK RELATED TO HAPTIC ACTUATOR BY USING SPEAKER

(71) Applicant: SAMSUNG ELECTRONICS CO., LTD., Suwon-si (KR)

(72) Inventors: Taekyun Kim, Suwon-si (KR); Jeongwook Kwon, Suwon-si (KR); Taeuk Park, Suwon-si (KR); Sangheon Kim, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 218 days.

(21) Appl. No.: 18/141,152

(22) Filed: Apr. 28, 2023

(65) Prior Publication Data

US 2024/0021056 A1 Jan. 18, 2024

Related U.S. Application Data

(63) Continuation of application No. PCT/KR2023/005513, filed on Apr. 21, 2023.

(30) Foreign Application Priority Data

Jul. 15, 2022 (KR) ........................ 10-2022-0087839
Aug. 19, 2022 (KR) ........................ 10-2022-0104234

(51) Int. Cl.
*G08B 7/06* (2006.01)
*G08B 3/10* (2006.01)
(Continued)

(52) U.S. Cl.
CPC ................. *G08B 7/06* (2013.01); *G08B 3/10* (2013.01); *G08B 6/00* (2013.01); *H04R 1/028* (2013.01);
(Continued)

(58) Field of Classification Search
CPC ... G08B 7/06; G08B 3/10; G08B 6/00; H04R 1/028; H04R 3/00; H04R 2400/03; H04R 2499/11; H04R 2499/15
See application file for complete search history.

(56) References Cited

U.S. PATENT DOCUMENTS 8,494,575 B2 7/2013 Foley et al.
8,543,166 B2 9/2013 Choi et al.
(Continued)

FOREIGN PATENT DOCUMENTS

JP 4247276 B2 4/2009
JP 2012-129602 A 7/2012
(Continued)

OTHER PUBLICATIONS

International Search Report (PCT/ISA/210) issued by the International Searching Authority on Jul. 28, 2023 in International Application No. PCT/KR2023/005513.
(Continued)

*Primary Examiner* — Andrew Sniezek
(74) *Attorney, Agent, or Firm* — Sughrue Mion, PLLC

(57) ABSTRACT

According to an embodiment, a processor of an electronic device is configured to identify the direction of the electronic device using a sensor of the electronic device. The processor outputs an acoustic signal representing a vibration notification for a preset event through a speaker of the electronic device, based on identifying a direction corresponding to a reference direction for representing the vibration notification for the preset event using the speaker. The processor is configured to refrain from outputting the acoustic signal through the speaker based on identifying the direction different from the reference direction, and vibrate
(Continued)

the housing using the haptic actuator of the electronic device to output the vibration notification regarding the preset event.

19 Claims, 14 Drawing Sheets

(51) Int. Cl.

| | |
|---|---|
| ***G08B 6/00*** | (2006.01) |
| ***H04R 1/02*** | (2006.01) |
| ***H04R 3/00*** | (2006.01) |

(52) U.S. Cl.

CPC ........... *H04R 3/00* (2013.01); *H04R 2400/03* (2013.01); *H04R 2499/11* (2013.01); *H04R 2499/15* (2013.01)

(56) References Cited

U.S. PATENT DOCUMENTS

| | | | | |
|---|---|---|---|---|
| 9,218,727 | B2 | 12/2015 | Rothkopf et al. | |
| 9,619,061 | B2 | 4/2017 | Lee et al. | |
| 10,276,000 | B2 | 4/2019 | Moussette et al. | |
| 10,290,202 | B2 | 5/2019 | Pakula et al. | |
| 10,386,927 | B2 | 8/2019 | Kim et al. | |
| 11,221,676 | B2 | 1/2022 | Song et al. | |
| 11,616,869 | B2 | 3/2023 | Lee et al. | |
| 2010/0056223 | A1 | 3/2010 | Choi et al. | |
| 2010/0117975 | A1 | 5/2010 | Cho | |
| 2021/0058503 | A1 * | 2/2021 | Lee | H04M 1/0268 |
| 2021/0312771 | A1 | 10/2021 | Hill | |

FOREIGN PATENT DOCUMENTS

| | | | |
|---|---|---|---|
| KR | 10-2005-0051791 | A | 6/2005 |
| KR | 10-2010-0027501 | A | 3/2010 |
| KR | 10-2012-0085930 | A | 8/2012 |
| KR | 10-2017-0061473 | A | 6/2017 |
| KR | 10-2021-0022302 | A | 3/2021 |
| WO | 2005/076586 | A1 | 8/2005 |
| WO | 2017/177409 | A1 | 10/2017 |

OTHER PUBLICATIONS

Written Opinion (PCT/ISA/237) issued by the International Searching Authority on Jul. 28, 2023 in International Application No. PCT/KR2023/005513.

Communication dated Jul. 3, 2025, issued by the European Patent Office in European Application No. 23839763.2.

* cited by examiner

ELECTRONIC DEVICE AND METHOD FOR OUTPUTTING HAPTIC FEEDBACK RELATED TO HAPTIC ACTUATOR BY USING SPEAKER

CROSS-REFERENCE TO RELATED APPLICATION(S)

This application is a continuation of PCT International Application No. PCT/KR2023/005513, which was filed on Apr. 21, 2023, and claims priority to Korean Patent Application No. 10-2022-0087839, filed on Jul. 15, 2022, and claims priority to Korean Patent Application No. 10-2022-0104234, filed on Aug. 19, 2022, in the Korean Intellectual Property Office, the disclosure of which are incorporated by reference herein their entirety.

BACKGROUND

1. Technical Field

The disclosure relates to an electronic device and a method for outputting haptic feedback related to a haptic actuator by using a speaker.

2. Description of Related Art

An electronic device may interact with a user by stimulating at least one of the user's five senses. For example, the electronic device may stimulate the user's tactile sensation and/or hearing based on a vibration. The electronic device may include a haptic actuator that generates the vibration.

SUMMARY

According to an embodiment, an electronic device may comprise a housing, a haptic actuator, a speaker, a sensor, and a processor. The processor may be configured to identify a direction of the electronic device by using the sensor. The processor may be configured to, based on identifying the direction corresponding to a reference direction representing a vibration notification regarding a preset event, output, through the speaker, an acoustic signal that represents the vibration notification regarding the preset event. The processor may be configured to, based on identifying the direction not corresponding to the reference direction, refrain from outputting the acoustic signal through the speaker, and controlling the haptic actuator to output the vibration notification regarding the preset event by vibrating the housing of the electronic device.

According to an embodiment, a method of an electronic device may include identifying a direction of the electronic device by using a sensor of the electronic device. The method may include, based on identifying the direction corresponding to a reference direction representing vibration notification regarding a preset event by using the sensor, outputting an acoustic signal representing a vibration notification regarding the preset event through a speaker in the electronic device. The method may include, based on identifying the direction not corresponding to the reference direction, refraining from outputting the acoustic signal through the speaker, and outputting 840 the vibration notification regarding the preset event by vibrating a housing of the electronic device by using a haptic actuator of the electronic device.

According to an embodiment, an electronic device may comprise a housing, a haptic actuator, a speaker, a sensor, and a processor 120. The processor is configured to output, through the speaker at a first volume, a first acoustic signal included in a media content. The processor is configured to, based on an occurrence of a preset event while the first acoustic signal is output, identify a posture of the housing by using the sensor. The processor is configured to, based on the posture corresponding to a reference posture, output, through the speaker, a second acoustic signal representing a vibration notification regarding the preset event at a second volume different from the first volume. The processor is configured to, based on the posture not corresponding to the reference posture, output the vibration notification by controlling the haptic actuator while the first acoustic signal is output at the first volume.

According to an embodiment, a method of an electronic device may comprise outputting through a speaker of the electronic device at a first volume, a first acoustic signal included in a media content. The method may include, based on an occurrence of a preset event while outputting the first acoustic signal, identifying a posture of a housing of the electronic device by using a sensor of the electronic device. The method may include, based on identifying the posture corresponding to a reference posture, outputting, through the speaker, a second acoustic signal representing a vibration notification regarding the preset event at a second volume different from the first volume. The method may include, based on the posture not corresponding to the reference posture, outputting the vibration notification by controlling a haptic actuator of the electronic device while outputting the first acoustic signal based on the first volume.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
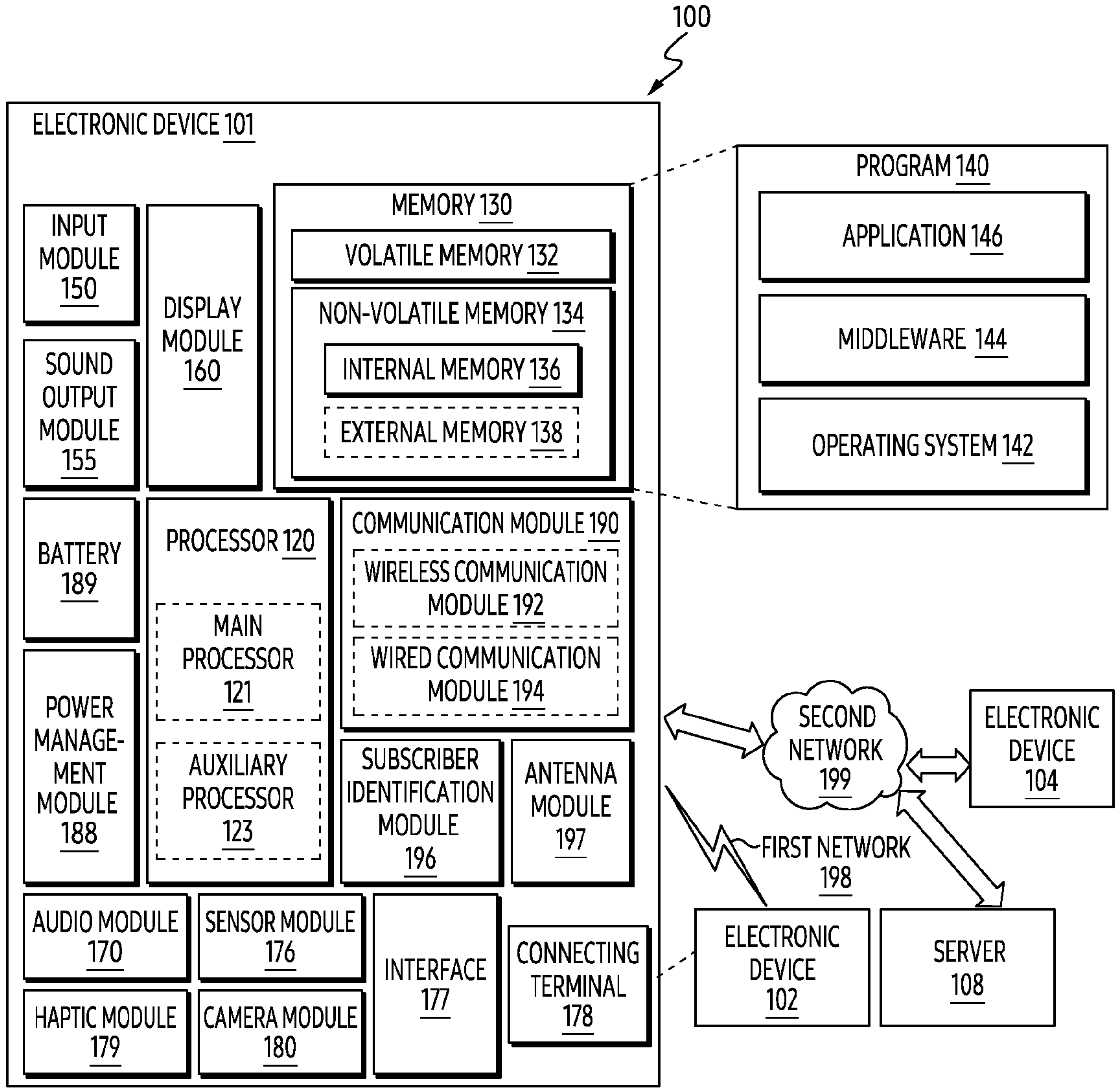
FIG. 1 is a block diagram of an electronic device, according to one or more embodiments.

Hereinafter, various embodiments of the present disclosure will be described with reference to the accompanying drawings.

The various embodiments and terms used herein are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. In this document, each of the phrases such as "A or B", "at least one of A and B", "at least one of A, B and C", "at least one of A, B, or C", and "at least one of A, B, or C" may include any one of the phrases together, or all possible combinations thereof. Terms such as "the first", "the second", or "first", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", it means that some of the components can be connected directly (e.g., wired), wirelessly, or through a third component.

The term "module" used in various embodiments of the present disclosure may include a unit implemented in hardware, software, or firmware and be used interchangeably with terms such as logic, logic block, component, or circuitry, for example. The module may be a minimum unit or a part of the integrally configured component or the component that performs one or more functions. For example, according to one or more embodiments, the module may be implemented in the form of an application-specific integrated circuit (ASIC).

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to one or more embodiments, the electronic device 101 may communicate with the electronic device 104 via the server 108. According to one or more embodiments, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, as understood by one of ordinary skill in the art, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one or more embodiments, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to one or more embodiments, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to consume less power than the main processor 121, or to be specific to a specified function. The auxiliary processor 123 may be implemented as separate from, or as part of the main processor 121.

The auxiliary processor 123 may control at least some functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to one or more embodiments, the auxiliary processor 123 (e.g., an image signal processor or a communication processor) may be implemented as part of another component (e.g., the camera module 180 or the communication module 190) functionally related to the auxiliary processor 123. According to one or more embodiments, the auxiliary processor 123 (e.g., the neural processing unit) may include a hardware structure specified for artificial intelligence model processing. An artificial intelligence model may be generated by machine learning. Such learning may be performed, for example, by the electronic device 101 where the artificial intelligence is performed or via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network, a combination of two or more thereof, or any other neural network known to one of ordinary skill in the art. The artificial intelligence model may, in one or more embodiments, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to one or more embodiments, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to one or more embodiments, the display module 160 may include a touch sensor configured to detect a touch, or a pressure sensor configured to measure the intensity of force incurred by the touch.

The audio module 170 may convert a sound into an electrical signal and vice versa. According to one or more embodiments, the audio module 170 may obtain the sound via the input module 150, or output the sound via the sound output module 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to one or more embodiments, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to one or more embodiments, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to one or more embodiments, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to one or more embodiments, the haptic module 179 may include, for example, a motor, a piezoelectric element, or an electric stimulator.

The camera module 180 may capture a still image or moving images. According to one or more embodiments, the camera module 180 may include one or more lenses, image sensors, image signal processors, or flashes.

The power management module 188 may manage power supplied to the electronic device 101. According to one or more embodiments, the power management module 188 may be implemented as at least part of, for example, a power management integrated circuit (PMIC).

The battery 189 may supply power to at least one component of the electronic device 101. According to one or more embodiments, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to one or more embodiments, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to one or more embodiments, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one or more embodiments, the antenna module 197 may include an antenna including a radiating element composed of a conductive material or a conductive pattern formed in or on a substrate (e.g., a printed circuit board (PCB)). According to one or more embodiments, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to one or more embodiments, another component (e.g., a radio frequency integrated circuit (RFIC)) other than the radiating element may be additionally formed as part of the antenna module 197.

According to various embodiments, the antenna module 197 may form a mmWave antenna module. According to one or more embodiments, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one or more embodiments, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to one or more embodiments, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In one or more embodiments, the external electronic device 104 may include an internet-of-things (IoT) device. The server 108 may be an intelligent server using machine learning and/or a neural network. According to one or more embodiments, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to one or more embodiments of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, configured to perform one or more functions. For example, according to one or more embodiments, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This configuration allows the machine to be operated to perform at least one function according to the at least one instruction invoked. The one or more instructions may include a code generated by a complier or a code executable by an interpreter. The machine-readable storage medium may be provided in the form of a non-transitory storage medium. In one or more embodiments, the term "non-transitory" means that the storage medium is a tangible device, and does not include a signal (e.g., an electromagnetic wave), but this term does not differentiate between where data is semi-permanently stored in the storage medium and where the data is temporarily stored in the storage medium.

According to one or more embodiments, a method, according to various embodiments of the disclosure, may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. In one or more embodiments, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
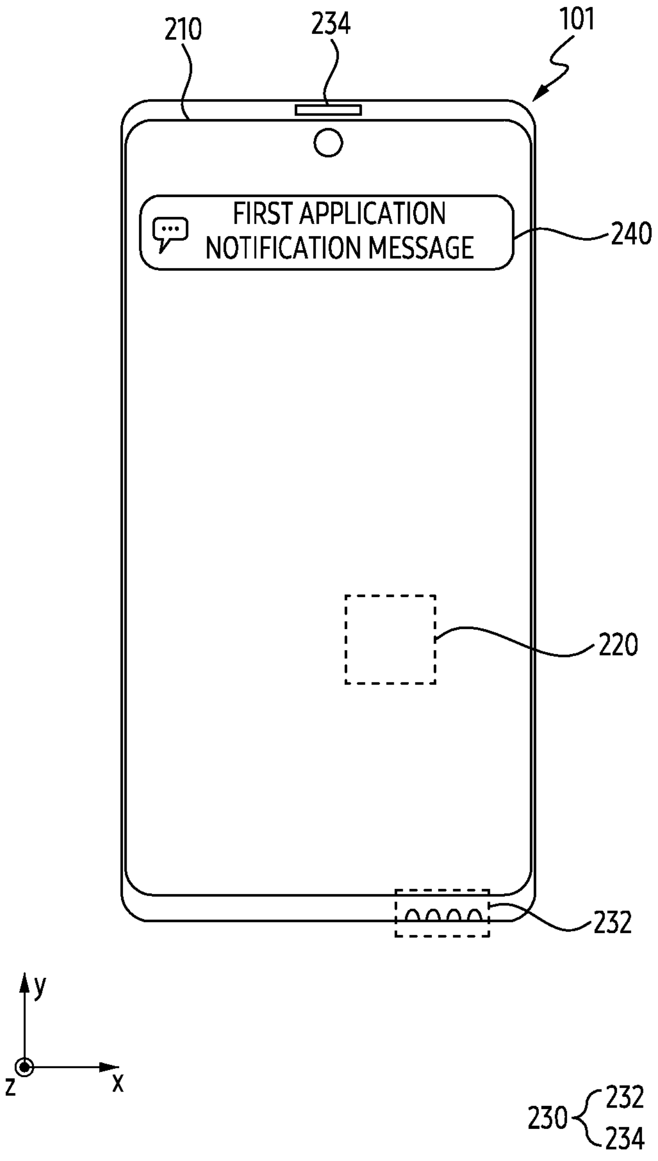
FIG. 2 illustrates an example of an operation in which an electronic device controls a haptic actuator and/or a speaker to output a signal related to a vibration notification, according to one or more embodiments.

FIG. 2 illustrates an example of an operation in which an electronic device 101 controls a haptic actuator 220 and/or a speaker 230 to output a signal related to a vibration notification, according to one or more embodiments. The electronic device 101 of FIG. 2 may include the electronic device 101 of FIG. 1. In one or more embodiments, the electronic device 101 may be a terminal owned by a user. For example, the terminal may include a personal computer (PC) such as a laptop and a desktop, a smartphone, a smartpad, a tablet PC, a smartwatch, a smart accessory such as a head-mounted device (HMD).

Referring to FIG. 2, the electronic device 101 according to one or more embodiments may include a display 210. The electronic device 101 may output visualized information (e.g., at least one of screens of FIGS. 2, 5A to 5B, and/or 6A to 6C) to a user by using the display 210. The display 210 may include a flat panel display (FPD) and/or an electronic paper. The FPD may include a liquid crystal display (LCD), a plasma display panel (PDP), and/or one or more light emitting LEDs. The LED may include an organic LED (OLED).

According to one or more embodiments, the display 210 of the electronic device 101 may include a sensor (e.g., a touch sensor panel (TSP)) for detecting an external object (e.g., a user's finger) on the display 210. For example, the electronic device 101 may detect an external object in contact with the display 210 or floating on the display 210, based on the TSP. In response to detecting the external object, the electronic device 101 may execute a function related to a specific visual object corresponding to the position of the external object on the display 210 among the visual objects displayed in the display 210.

Referring to FIG. 2, according to one or more embodiments, the electronic device 101 may include a haptic actuator 220 for generating vibration. The haptic actuator 220 may include an eccentric rotating mass (ERM) and/or a linear resonant actuator (LRA). In one or more embodiments, in which the haptic actuator 220 includes the ERM, the haptic actuator 220 may repeatedly move along a plurality of axes (e.g., at least two of the x-axis, y-axis, or z-axis in FIG. 2) in a coordinate space to generate vibration. In one or more embodiments, in which the haptic actuator 220 includes the LRA, the haptic actuator 220 may repeatedly move along a single axis in the coordinate space to generate vibration. While the haptic actuator 220 vibrates the housing of the electronic device 101, the vibration of the housing may generate a sound (e.g., a friction sound) based on friction between the housing and an external object. While the haptic actuator 220 vibrates the housing of the electronic device 101, a user holding the housing may recognize haptic feedback of the electronic device 101 based on the vibration of the housing. The position of the haptic actuator 220 in the electronic device 101 is not limited to the position illustrated in FIG. 2. One or more hardware equipment and hardware configurations included in the electronic device 101 to control the haptic actuator 220 will be described with reference to FIG. 3.

Referring to FIG. 2, according to one or more embodiments, the electronic device 101 may include a speaker 230 for outputting an acoustic signal. Referring to FIG. 2, one or more embodiments in which the electronic device 101 includes two speakers 232 and 234 is illustrated. However, as understood by one of ordinary skill in the art, any desired number of speakers, and any position of the speakers, may be utilized. For example, the speaker 232 may be disposed on a first surface of electronic device 101. The first surface may be referred to as a bottom surface. For example, the speaker 234 may be disposed on a second surface opposite to the first surface of the electronic device 101 or may be disposed on a third surface adjacent to the second surface. In the above example, the second surface may be referred to as a top surface, and the third surface may be referred to as a front surface or back surface. Referring to FIG. 2, the display 210 may be disposed on the third surface and/or the front surface. The electronic device 101 may output different acoustic signals based on stereo, respectively, through the speakers 232 and 234 disposed on the first and second surfaces facing away from each other.

According to one or more embodiments, the electronic device 101 may associate the output of a vibration notification using the haptic actuator 220 with a preset event. The preset event may be generated by receiving a signal for call establishment through a communication module (e.g., the communication module 190 of FIG. 1). The preset event may be generated by a request of an application installed in the electronic device 101. The preset event may be generated by receiving a push message transmitted from an external electronic device (e.g., a push server) connected to the electronic device 101. The preset event may be generated by a call of a designated application programming interface (API) provided by an operating system (e.g., Android) of the electronic device 101. For example, the designated API may be called by at least one of receiving the signal for the call establishment, the request of the application, or the reception of the push message. According to one or more embodiments, an operation in which the electronic device 101 controls the haptic actuator 220 based on a call of the designated API will be described with reference to FIG. 4.

Referring to FIG. 2, according to one or more embodiments, an exemplary state in which the electronic device 101 displays a visual object 240 for notifying the reception of the push message is illustrated. According to one or more embodiments, the electronic device 101 may display the visual object 240 within at least a portion of the display 210 based on receiving the push message. For example, the electronic device 101 may display the visual object 240 in response to a call of a designated API by the electronic device 101. The visual object 240 may include a name and/or an icon of an application related to the visual object 240. The visual object 240 may include text generated based on the execution of the application. In response to an input indicating that the visual object 240 is selected, the electronic device 101 may display a screen provided from an application corresponding to the visual object 240 on the display 210. In response to the input, the electronic device 101 may at least temporarily cease displaying the visual object 240.

According to one or more embodiments, the electronic device 101 may control the haptic actuator 220 to output a vibration notification in response to identifying a preset event. The electronic device 101 may identify whether a state of the electronic device 101 is in a designated state in which a friction sound is generated due to the vibration of the haptic actuator 220. The electronic device 101 may identify the state of the electronic device 101 by using one or more sensors (e.g., sensor module 176). The designated state may include a state in which generation of the friction sound by the electronic device 101 is prevented. The designated state may be related to arrangement of the housing of the electronic device 101 and the haptic actuator 220. The designated state may be related to a vibration direction of the housing of the electronic device 101 by the haptic actuator 220 and the orientation of the electronic device 101. The designated state may be related to a grip on the housing. The designated state may be related to a posture of the electronic device 101. Different examples of the designated state will be described with reference to FIGS. 5A to 5B, FIGS. 6A to 6C, and/or FIGS. 7A to 7B.

According to one or more embodiments, in a designated state in which generation of the friction sound by the haptic actuator 220 is prevented, the electronic device 101 may output an acoustic signal substantially identical to the friction sound by controlling the speaker 230, or may output an acoustic signal representing a vibration notification based on the haptic actuator 220. In the designated state, the electronic device 101 may output an acoustic signal by using the speaker 230 and may output a vibration notification by using the haptic actuator 220. In this designated state, the user may hear an acoustic signal output by the speaker 230 regardless of a friction sound generated by the haptic actuator 220. For example, even though the user may not hear a friction sound, the electronic device 101 may notify the user of a message related to a vibration notification by using the acoustic signal. For example, the electronic device 101 may enhance the recognition of a vibration notification by a user using an acoustic signal.

As described above, according to one or more embodiments, the electronic device 101 may control the speaker 230 in response to a preset event related to the haptic actuator 220. For example, in a designated state where the difficulty of recognizing the vibration notification by the haptic actuator 220 is high, the electronic device 101 may output an acoustic signal representing the friction sound and/or the vibration notification by the haptic actuator 220 using the speaker 230. The electronic device 101 may advantageously compensate or reduce the difficulty in recognizing the vibration notification by using the acoustic signal.

Figure 3:
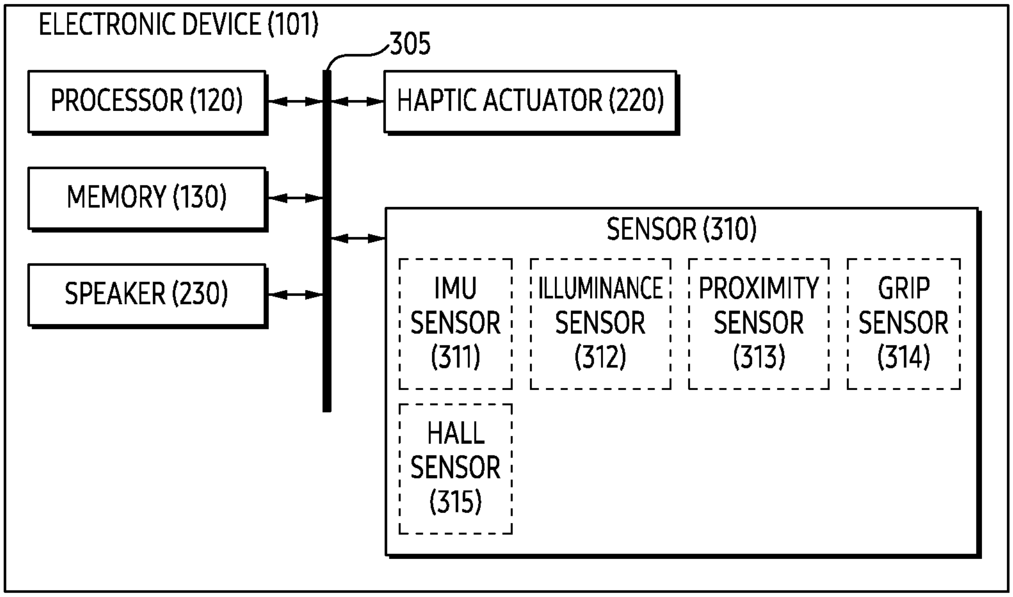
FIG. 3 is a block diagram of an electronic device, according to one or more embodiments.

Referring to FIG. 3, according to one or more embodiments, one or more hardware equipment and hardware configurations included within the electronic device 101 will be described.

FIG. 3 is a block diagram of an electronic device 101 according to one or more embodiments. The electronic device 101 of FIG. 3 may be an example of the electronic device 101 of FIGS. 1 to 2. For example, the electronic device 101, the haptic actuator 220, and the speaker 230 of FIG. 2 may include the electronic device 101, the haptic actuator 220, and the speaker 230, respectively, of FIG. 3.

Referring to FIG. 3, according to one or more embodiments, the electronic device 101 may include at least one of the processor 120, the memory 130, the haptic actuator 220, the speaker 230, or the sensor 310. The processor 120, the memory 130, the haptic actuator 220, the speaker 230, and the sensor 310 may be electronically and/or operably coupled with each other by an electrical component such as a communication bus 305. In one or more examples, operatively coupled hardware may mean that a direct connection or indirect connection between hardware is established wired or wirelessly to ensure that the first of the hardware is controlled by the second hardware. Although illustrated based on different blocks, the embodiment is not limited thereto, and a portion of the hardware (e.g., at least a portion of the processor 120 and the memory 130) illustrated in FIG. 3 may be included in a single integrated circuit like a system on a chip (SoC). The type and/or number of hardware included in the electronic device 101 is not limited as shown in FIG. 3. For example, the electronic device 101 may include only a portion of the hardware shown in FIG. 3.

According to one or more embodiments, the processor 120 of electronic device 101 may include a circuit for processing data based on one or more instructions. For example, the hardware component for processing data may include an arithmetic and logic unit (ALU), a floating point unit (FPU), a field programmable gate array (FPGA), a central processing unit (CPU), or any other suitable processor structure known to one of ordinary skill in the art. The number of the processors 120 may be one or more. For example, the processor 120 may have a structure of a multi-core processor such as a dual core, a quad core, or a hexa core. The processor 120 of FIG. 3 may include the processor 120 of FIG. 1.

According to one or more embodiments, the memory 130 of the electronic device 101 may include a hardware for storing data and/or instructions input and/or output to and from the processor 120. For example, the memory 130 may include a volatile memory such as random-access memory (RAM) and/or a non-volatile memory such as read-only memory (ROM). For example, the volatile memory may include at least one of dynamic RAM (DRAM), static RAM (SRAM), Cache RAM, or pseudo SRAM (PSRAM). For example, the nonvolatile memory may include at least one of programmable ROM (PROM), erasable PROM (EPROM), electrically erasable PROM (EEPROM), flash memory, hard disk, compact disk, or embedded multi-media card (eMMC). The memory 130 of FIG. 3 may include the memory 130 of FIG. 1.

One or more instructions indicating a calculation and/or an operation to be performed on data by the processor 120 may be stored in the memory 130. A set of one or more instructions may be referred to as firmware, operating system, process, library, routine, sub-routine, and/or application. For example, when a set of a plurality of instructions deployed in the form of operating system, firmware, driver, and/or application is executed, the electronic device 101, and/or the processor 120 may perform at least one of the operations of FIGS. 8 to 10. In one or more examples, the fact that the application is installed in the electronic device 101 may indicate that one or more instructions provided in the form of the application are stored in the memory 130 of the electronic device 101, and mean that the one or more applications are stored in an executable format (e.g., a file having an extension designated by the operating system of the electronic device 101) by the processor 120 of the electronic device 101.

Referring to FIG. 3, according to one or more embodiments, the electronic device 101 may include the haptic actuator 220 and/or the speaker 230 as circuitry configured to output information in a form other than a visualized form. The electronic device 101 may output information in an aural form by using the speaker 230. The electronic device 101 may output information in a tactual form by using the haptic actuator 220. The haptic actuator 220 and/or the speaker 230 may be controlled by an electrical signal transmitted from the processor 120. For example, the processor 120 may output the electrical signal for controlling haptic actuator 220 and/or speaker 230 in response to a preset event. Although one or more embodiments including both the haptic actuator 220 and the speaker 230 is described, the embodiments are not limited thereto, and according to one or more embodiments, the haptic actuator 220 may be omitted.

According to one or more embodiments, the sensor 310 of the electronic device 101 may generate electrical information that can be processed by the processor 120 and/or the memory 130 from non-electrical information related to the electronic device 101. The electronic information generated by sensor 310 may be stored in the memory 130, processed by the processor 120, and/or transmitted to another electronic device distinguished from the electronic device 101. Referring to FIG. 3, the sensor 310 in the electronic device 101 may include an inertial measurement unit (IMU) sensor 311, an illuminance sensor 312, a proximity sensor 313, a grip sensor 314, a hall sensor 315, a combination thereof, or any other suitable sensor known to one of ordinary skill in the art. According to one or more embodiments, the sensor 310 may include an integrated circuit for processing sensor data output from at least one of the IMU sensor 311, the illuminance sensor 312, the proximity sensor 313, the grip sensor 314, or the hall sensor 315. The integrated circuit included in the sensor 310 may be referred to as a sensor hub, a sensor IC, and/or a controller. The sensor 310 of FIG. 3 may be an example of the sensor module 176 of FIG. 1. According to one or more embodiments, the processor 120 of the electronic device 101 may select and/or identify at least one of the haptic actuator 220 or the speaker 230 to output a notification, in response to identification of the preset event, by using sensor data output from the sensor 310. The processor 120 may output a vibration notification related to the preset event based on at least one of the haptic actuator 220 or the speaker 230 selected and/or identified based on sensor data.

According to one or more embodiments, the IMU sensor 311 of the electronic device 101 may include an acceleration sensor, a geomagnetic sensor, a gyro sensor, or a combination thereof. The acceleration sensor and the geomagnetic sensor may be included in the electronic device 101 to measure physical movement (e.g., translation motion) of the electronic device 101. For example, the acceleration sensor may output sensor data indicating the direction and/or magnitude of a vector corresponding to an applied acceleration (e.g., acceleration of gravity) applied to the electronic device 101 by using a plurality of designated axes (e.g., x-axis, y-axis, z-axis) that are perpendicular to each other. For example, the geomagnetic sensor may output sensor data indicating the direction (e.g., the direction of the N pole) of the magnetic field applied to the electronic device 101 by using two-dimensional to three-dimensional axes. The gyro sensor may be included in the electronic device 101 to measure rotation of the electronic device 101. For example, the gyro sensor may output sensor data indicating a parameter (e.g., angular velocity) indicating the rotation of the electronic device 101 based on the axes.

According to one or more embodiments, the illuminance sensor 312 of the electronic device 101 may include an illuminance sensor that measures brightness of ambient light or any other type of light known to one of ordinary skill in the art. For example, the illuminance sensor 312 may be exposed at least partially through one surface of the housing of the electronic device 101 (e.g., the front surface on which the display 210 of FIG. 2 is disposed). The illuminance sensor 312 may output sensor data indicating the brightness of ambient light measured at least a portion exposed on the one surface.

According to one or more embodiments, the proximity sensor 313 of the electronic device 101 may identify an external object spaced apart from the electronic device 101 by a designated distance or less. The designated distance may be set by the sensitivity of the proximity sensor 313. For example, the proximity sensor 313 may be disposed on the front surface of the housing of the electronic device 101 to identify an external object adjacent to the front surface. For example, while the user is making a phone call by using the electronic device 101, the processor 120 of the electronic device 101 may identify that the user's body part (e.g., one side of the face) approaches the front surface, by using the proximity sensor 313. For example, in a state in which an external object spaced apart from the electronic device 101 by a designated distance or less is identified, the proximity sensor 313 may output sensor data indicating a presence of the external object and a distance between the electronic device 101 and the external object.

According to one or more embodiments, the grip sensor 314 of the electronic device 101 may detect a grip on the housing of the electronic device 101. The grip may correspond to a user's gesture holding the electronic device 101.

The grip sensor 314 may detect the grip based on an electric field formed in a space adjacent to the electronic device 101. For example, the grip sensor 314 may output sensor data indicating the grip of the electronic device 101 or release of the grip of the electronic device 101.

According to one or more embodiments, the hall sensor 315 of the electronic device 101 may include a magnet and a magnetic sensor that measures a change in a magnetic field formed by the magnet. The magnet and the magnetic sensor may be disposed in different portions of the housing of the electronic device 101. The hall sensor 315 may identify a distance between the portions based on the change in the magnetic field measured by the magnetic sensor. In one or more embodiments in which the electronic device 101 includes a deformable housing (e.g., foldable housing), the electronic device 101 may identify the shape of the housing by using the magnet disposed in different portions of the housing and the hall sensor 315 including the magnetic sensor. For example, the hall sensor 315 may output sensor data indicating the distance and/or the shape of the housing. According to one or more embodiments, an operation performed by the electronic device 101 based on the shape of the housing identified by using the hall sensor 315 will be described with reference to FIGS. 6A to 6C and/or FIGS. 7A to 7B.

Although the IMU sensor 311, the illuminance sensor 312, the proximity sensor 313, the grip sensor 314, and the hall sensor 315 included in the sensor 310 have been described as examples, the embodiments are not limited thereto. According to one or more embodiments, at least one of the sensors 310 illustrated in FIG. 3 may be omitted. According to one or more embodiments, the sensor 310 may include additional sensors. For example, the sensor 310 may further include a global positioning system (GPS) sensor for detecting a geographic location of the electronic device 101.

According to one or more embodiments, the electronic device 101 may control, in response to identification or detection of a preset event, the haptic actuator 220 to output a vibration notification. Activation of the haptic actuator 220 by the electronic device 101 may cause a vibration of the housing. According to one or more embodiments, in a state in which the haptic actuator 220 is activated, the electronic device 101 may identify whether to additionally control the speaker 230 based on a state of the electronic device 101 (e.g., the posture, direction, and/or shape of the electronic device 101). The state of the electronic device may be determined or identified based on sensor data from the sensor 310. For example, the electronic device 101 may identify whether to control the speaker 230 based on the preset event. The embodiments are not limited thereto, and for example, the electronic device 101 may at least temporarily cease outputting a vibration notification from the haptic actuator 220 based on identifying that the speaker 230 is currently outputting or is instructed to output an auditory notification.

Based on identifying that the speaker 230 is controlled based on the preset event (e.g., acoustic signal is outputted through speaker 230), the electronic device 101 may output an acoustic signal representing a vibration notification requested by the preset event through the speaker 230. For example, the acoustic signal may be output based on audio data in which the friction sound generated by the vibration notification is recorded in advance. The audio data may be stored in the memory 130 of the electronic device 101. The electronic device 101 may output the acoustic signal representing the vibration notification based on a designated volume associated with the preset event. For example, the volume on which the electronic device 101 outputs the acoustic signal may be different from the volume (e.g., media volume) related to the output of the media content, or may be adjusted independently.

As described above, according to one or more embodiments, the electronic device 101 may increase the probability that a vibration notification based on the haptic actuator 220 is recognized by using the speaker 230. For example, a magnitude of the friction sound generated by the vibration of the housing may be changed based on the direction in which the housing of the electronic device 101 vibrates by the haptic actuator 220. In one or more examples, in a designated state in which the magnitude of the friction sound is relatively low, the electronic device 101 may output an acoustic signal representing a vibration notification through the speaker 230. The acoustic signal may include a virtual friction sound. A virtual friction sound may be an auditory signal that represents an actual friction sound. Since the electronic device 101 outputs the acoustic signal, the possibility of drawing a user's attention by the electronic device 101 may be advantageously increased within the designated state.

Outputting a virtual friction sound by the electronic device 101 using the speaker 230 may be performed based on the execution of instructions stored in the memory 130. Based on the instructions, a condition for outputting the virtual friction sound may be set according to a design of the haptic actuator 220. For example, the direction in which the housing is vibrated by the haptic actuator 220 may be dependent on the location and/or direction in which the haptic actuator 220 is installed within the housing. The instructions stored in the memory 130 may include one or more conditions set based on whether the haptic actuator 220 is included in the housing of the electronic device 101, and the location and/or direction in which the haptic actuator 220 is installed within the housing. For example, the electronic device 101 may optimize the conditions for outputting the virtual friction sound by using the instructions. Since the conditions are optimized, the electronic device 101 may more accurately identify a state in which generation of the vibration notification by the haptic actuator 220 is prevented.

Figure 4:
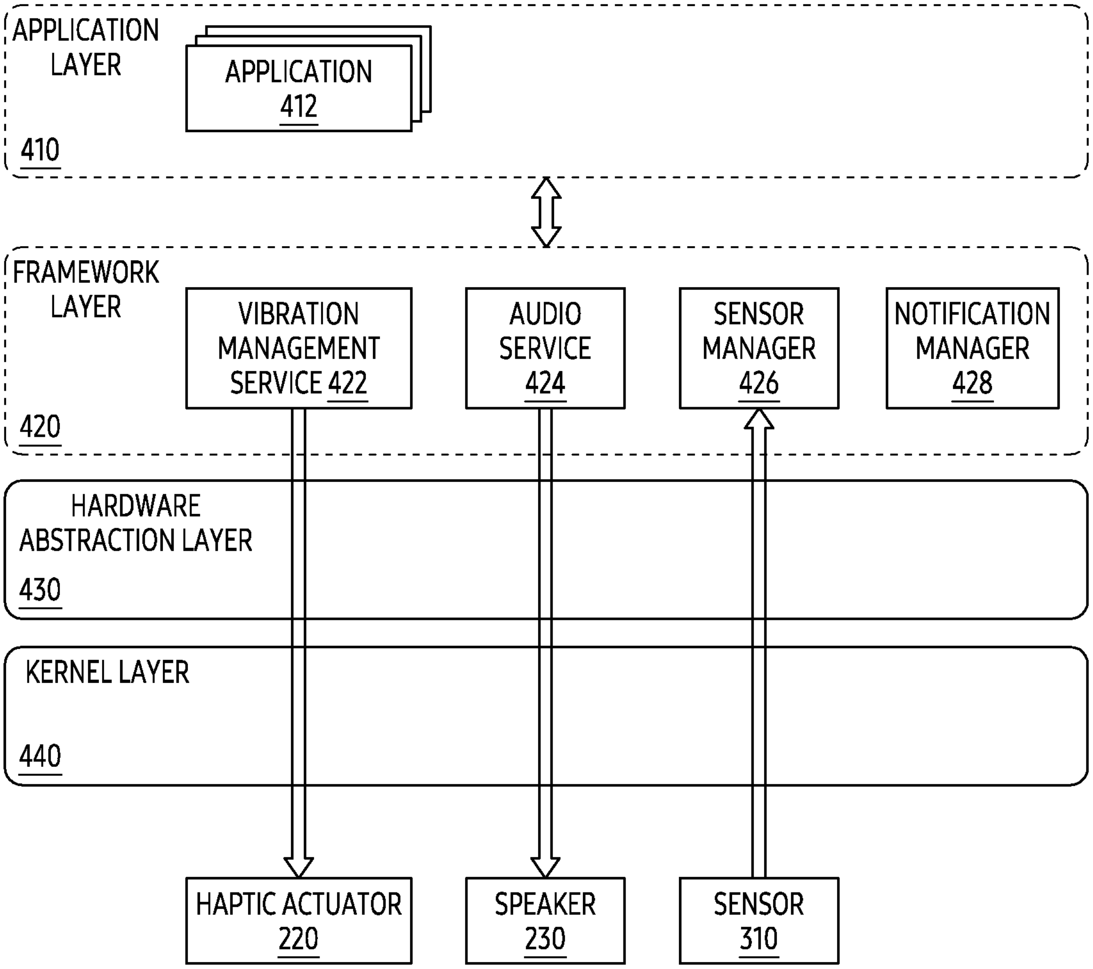
FIG. 4 illustrates an example of a block diagram of processes executed by an electronic device, according to one or more embodiments.

Referring to FIG. 4, according to one or more embodiments, an operation performed by the processor 120 of the electronic device 101 based on the set of instructions stored in the memory 130 will be described.

FIG. 4 illustrates an example of a block diagram of processes executed by an electronic device, according to one or more embodiments. The electronic device of FIG. 4 may be an example of the electronic device 101 of FIGS. 1 to 3. For example, the electronic device 101, the haptic actuator 220, the speaker 230, and the sensor 310 of FIG. 3 may include the electronic device, the haptic actuator 220, the speaker 230, and the sensor 310 of FIG. 4.

Referring to FIG. 4, according to one or more embodiments, processes (e.g., the application 412, the vibration management service 422, the audio service 424, the sensor manager 426, the notification manager 428) executed by the processor of the electronic device (e.g., the processor 120 of FIG. 3) may be divided into different blocks. The processes may refer to one or more units of operations performed by the processor. The processes may be referred to as instances. Referring to FIG. 4, according to one or more embodiments, functions and/or sub-routines included in one or more processes executed in the electronic device are illustrated separately according to information transmitted between the functions and/or sub-routines. According to one or more embodiments, the electronic device may execute one or more processes related to the control of the haptic actuator 220 and/or the speaker 230 based on one or more instructions stored in the memory (e.g., the memory 130 of FIG. 3). The processes may be executed in a first state for interacting with a user, or may be executed in a second state distinguished from the first state, such as a background process and/or a daemon (e.g., program running as a background process).

Referring to FIG. 4, layers for distinguishing processes based on functions and/or purposes of the processes executed by an electronic device are illustrated. According to one or more embodiments, the processor of the electronic device may support the exchange of information between the layers based on the API. For example, the application layer 410 may include processes for executing the application 412. For example, the framework layer 420 may include processes (e.g., system services) provided by the operating system to support the execution of the application 412. The hardware abstraction layer 430 may include processes for supporting control of hardware (e.g., the haptic actuator 220, the speaker 230, and/or the sensor 310) by processes classified into the application layer 410 and/or the framework layer 420. The kernel layer 440 may include a driver for controlling hardware (e.g., the haptic actuator 220, the speaker 230, and/or the sensor 310) included in the electronic device, and/or at least one process executed by driving the driver.

Referring to FIG. 4, according to one or more embodiments, the electronic device is a system service classified as the framework layer 420 and may execute the vibration management service 422, the audio service 424, the sensor manager 426, and the notification manager 428. The vibration management service 422 may be a system service for controlling the haptic actuator 220 and may be controlled by objects and/or class (e.g., vibrators and/or vibrator managers) generated by the electronic device running the application 412. The audio service 424 may be a system service for controlling the speaker 230 and may be controlled by an object and/or class (e.g., audio manager, media player, and/or sound pool) generated by the electronic device executing the application 412. The notification manager 428 may be a system service for controlling the user interface (UI) (e.g., notification center) provided by the operating system, and may be controlled by an object or class (e.g., notification manager) generated based on the execution of the application 412 and/or push service.

According to one or more embodiments, the electronic device may provide state information collected by the sensor 310 based on the sensor manager 426. The state information may be accessible by the framework layer 420 and/or the application layer 410. The state information provided by the sensor manager 426 may include sensor data received from the sensor 310 of the electronic device. For example, the state information may include sensor data adjusted by the direction of the electronic device within a space (e.g., the direction of the electronic device measured by the IMU sensor 311 of FIG. 3). The state information may include sensor data related to the shape of the housing of the electronic device (e.g., the hall sensor 315 of FIG. 3 and/or the IMU sensor 311). The state information may include sensor data indicating a grip on the housing detected by the grip sensor 314 of FIG. 3. The state information may include sensor data indicating a result of detecting an external object approaching the electronic device, detected by the illuminance sensor 312 of FIG. 3 and/or the proximity sensor 313. For example, the state information may include sensor data used to identify the posture and/or shape of the electronic device.

As described above with reference to FIGS. 2 to 3, the electronic device may identify a preset event for outputting a vibration notification based on the haptic actuator 220. The preset event may be generated based on the application 412 and/or the notification manager 428 executed by the electronic device. For example, the preset event may occur by a notification generated by the notification manager 428 or execution of a function provided by the application 412. For example, the function provided by the application 412 may include a function provided by a phone application and playing a ringing sound (e.g., playing the ringing sound upon receiving an incoming call or message). The electronic device may identify the preset event based on the execution of the vibration management service 422.

According to one or more embodiments, the electronic device may identify the occurrence of a preset event based on an object such as a vibrator and/or a class, by using the vibration management service 422. For example, the preset event may occur by a call of a designated method, provided by a class and/or a predefined object such as a vibrator. For example, the application 412 and/or the notification manager 428 may call the preset event based on vibration information indicating at least one of the intensity, frequency, number of repetitions, waveform, or period of vibration notification. The vibration information may be stored in a memory (e.g., the memory 130 of FIG. 3) based on a predefined data structure that corresponds to a vibration effect.

According to one or more embodiments, the electronic device may obtain state information from the sensor manager 426 based on the execution of the vibration management service 422. Obtaining state information from sensor manager 426 based on the execution of the vibration management service 422 may be performed in response to a change in posture, shape, and/or state of the electronic device by the sensor manager 426. The embodiments are not limited thereto, and the electronic device may repeatedly obtain state information every designated period based on the execution of the vibration management service 422. The electronic device may identify the state information in response to the preset event.

According to one or more embodiments, the electronic device may generate a control signal for controlling the haptic actuator 220 based on the execution of the vibration management service 422. The control signal may be dependent on vibration information related to the preset event. The control signal may include parameters indicating at least one of the intensity, frequency, number of repetitions, waveforms, or period of a vibration generated by the haptic actuator 220 vibrating the housing of the electronic device. The control signal generated based on the vibration management service 422 may be processed by processes in the hardware abstraction layer 430 and the kernel layer 440 and transmitted to the haptic actuator 220. For example, the process (e.g., vibrator HAL) in the hardware abstraction layer 430 may change the control signal generated based on the execution of the vibration management service 422 into a control signal readable by the process (e.g., vibrator driver) in the kernel layer 440. For example, the process (e.g., vibrator driver) in kernel layer 440 may generate an electrical signal to be transmitted from the processor of the electronic device to the haptic actuator 220 based on the changed control signal. Generating the electrical signal based on the process in the kernel layer 440 by the processor may be initiated, in response to a call from the designated API for generating vibration, by the application 412 and/or notification manager 428.

According to one or more embodiments, the electronic device may determine whether to control the speaker 230 in response to the preset event based on the execution of the vibration management service 422. The electronic device may identify whether to control the speaker 230 based on the state information identified by the sensor manager 426. For example, in case that the state of the electronic device identified by the state information corresponds to the designated state, the electronic device may control the speaker 230. The designated state in which the electronic device controls the speaker 230 may be related to a situation in which the user's recognition of friction sound generated by the vibration of the haptic actuator 220 is hindered.

For example, as described later with reference to FIGS. 5A and 6A to 6C, in case that the vibration of the housing by the haptic actuator 220 is generated by repeated movements along the designated axis, the designated state may include a state in which a direction of gravity acceleration applied to the designated axis and the housing is vertical. As described later with reference to FIGS. 5A to 5B, the designated state may be included in a state in which a grip on the housing is released. As described later with reference to FIGS. 7A to 7B, the designated state may include a state in which the space formed inside the housing is expanded by the deformation of the housing.

In the designated state, the electronic device may control the speaker 230 to output an acoustic signal representing vibration notification based on vibration information related to the preset event. In the designated state, the time period in which the acoustic signal is output may overlap or match with the time period in which the vibration notification is output by the haptic actuator 220. According to one or more embodiments, the electronic device may generate parameters for generating an acoustic signal based on at least one of intensity, frequency, number of repetitions, waveform, or period included in the vibration information. For example, the parameters may be stored in a data structure (e.g., objects and/or class defined by a media player and/or a sound pool) generated based on the execution of the vibration management service 422 by the electronic device. Therefore, the acoustic signal may be varied based on the parameters that correspond to the intensity and/or length of the vibration.

According to one or more embodiments, the electronic device may obtain information for playing an acoustic signal based on the vibration information. Since vibration information is generated based on a preset event, the information for playing an acoustic signal may include at least one parameter related to the preset event. The information for playing an acoustic signal may include a volume of the speaker 230 to output the acoustic signal. The information for playing the acoustic signal may include a playing period and/or a repetition number of the acoustic signal. The information for playing the acoustic signal may include a waveform of the acoustic signal or an identifier of the waveform. For example, the electronic device may obtain the information for playing an acoustic signal from at least one parameter extracted from the vibration information based on a data structure such as vibration effect. According to one or more embodiments, the electronic device may execute the audio service 424 based on the information obtained based on the vibration management service 422 and for playing an acoustic signal.

According to one or more embodiments, the electronic device may execute the audio service 424 based on the information obtained based on the vibration management service 422 to initiate control of the speaker 230. The audio service 424 may generate a control signal for controlling the speaker 230 by using the information obtained based on the vibration management service 422. The control signal may be sequentially processed by a process in the hardware abstraction layer 430 (e.g., audio HAL) and a process in the kernel layer 440 (e.g., audio driver). Based on the sequential processing of the control signal, the processor of the electronic device may output an electrical signal for playing the acoustic signal to the speaker 230.

According to one or more embodiments, outputting of an acoustic signal for the preset event based on the audio service 424 by the electronic device may be stopped when a period set by the preset event expires. For example, in response to the expiration of the period included in the vibration information for the preset event, the electronic device may cease outputting of the vibration notification by using the haptic actuator 220 based on the execution of the vibration management service 422. In one or more examples, in case that the electronic device outputs an acoustic signal indicating the vibration notification, the electronic device may cease outputting of the acoustic signal by using the speaker 230 based on the execution of the audio service 424, in response to the expiration of the period. In one or more embodiments, the electronic device may cease outputting the vibration notification and/or the acoustic signal, based on the application 412 executed by the electronic device and/or the API called by the notification manager 418. The API may include a method (e.g., a method provided by an object such as a vibrator and/or a vibration manager, and/or a class) for ceasing output of the vibration notification.

As described above, according to one or more embodiments, the electronic device may obtain vibration information used to control the haptic actuator 220, in response to the occurrence of a preset event for outputting a vibration notification based on the haptic actuator 220. The electronic device may obtain the vibration information by executing the vibration management service 422. The electronic device may vibrate the housing of the electronic device by controlling the haptic actuator 220 based on the vibration information. The electronic device may determine whether to control the speaker 230 by using the vibration information based on at least one of the vibration management service 422 or the sensor manager 426. When controlling the speaker 230, the electronic device may obtain information, readable by the audio service 424, from the vibration information by using the vibration management service 422. The electronic device may execute the audio service 424 based on the obtained information to output an acoustic signal through the speaker 230. Since the electronic device outputs the acoustic signal together with the output of the vibration notification based on the haptic actuator 220, the electronic device may promote interaction between the user and the electronic device. Since the electronic device controls the speaker 230 based on the preset event for outputting the vibration notification, the electronic device may provide a stimulation to the user based on the vibration notification, regardless of whether the haptic actuator 220 is included in the electronic device or is in a state of outputting a vibration notification.

According to one or more embodiments with reference to FIGS. 5A to 5B, FIGS. 6A to 6C, and/or FIGS. 7A to 7B, an operation of controlling the speaker 230 by the electronic device based on a preset event related to haptic actuator 220 will be described.

Figure 5A:
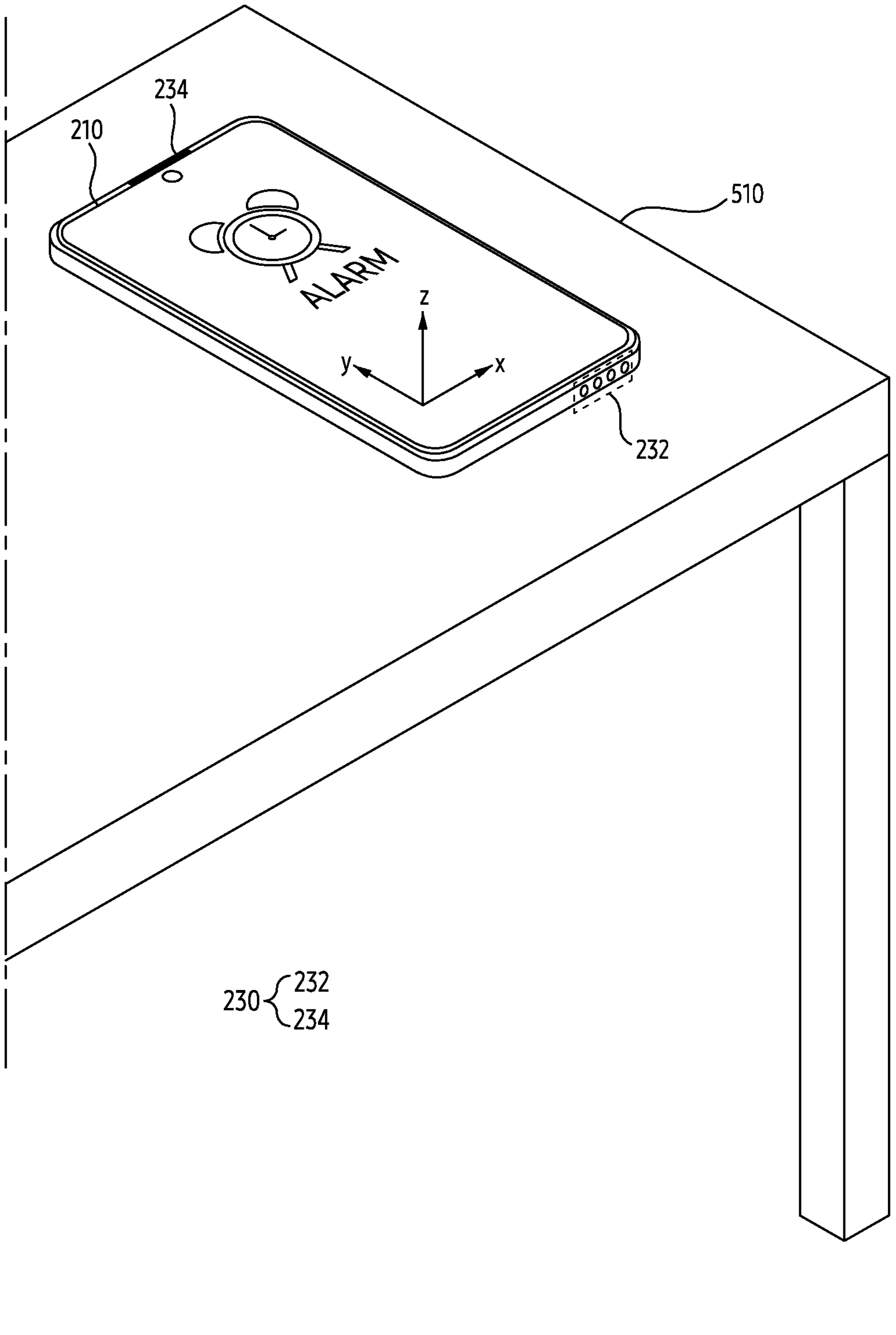
FIGS. 5A to 5B illustrate an example of an operation of identifying whether an electronic device outputs an acoustic signal representing a vibration notification through a speaker, according to one or more embodiments.
Figure 5B:
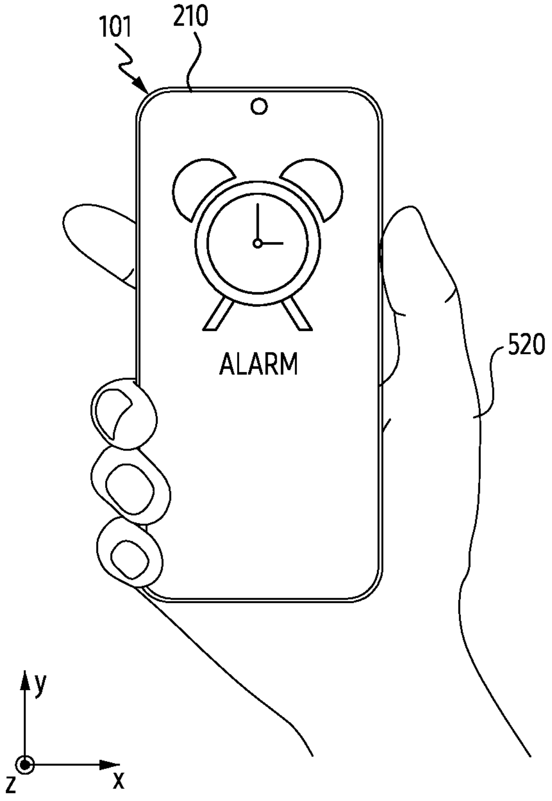

FIGS. 5A to 5B illustrate an example of an operation of identifying whether an electronic device outputs an acoustic signal representing a vibration notification through a speaker, according to one or more embodiments. The electronic device 101 of FIGS. 5A to 5B may be an example of the electronic device 101 of FIGS. 1 to 3, and/or the electronic device of FIG. 4. For example, the electronic device 101, the display 210, and the speaker 230 of FIG. 5A may include the electronic device 101, the display 210, and the speaker 230 of FIG. 3.

Referring to FIGS. 5A to 5B, according to one or more embodiments, an example of a state in which the electronic device 101 outputs a vibration notification based on execution of an alarm application is illustrated. For example, a preset event may occur based on whether the current time matches with a specific moment input by the user through the alarm application (e.g., alarm triggered). According to one or more embodiments, the electronic device 101 may output an alarm in response to identifying that the current time matches a moment set by a user input. Outputting the alarm by the electronic device 101 may include an operation of displaying a screen related to the alarm by using the display 210. Outputting the alarm by the electronic device 101 may include an operation of outputting a vibration notification by using a haptic actuator (e.g., the haptic actuator 220 of FIGS. 2 to 4). Outputting the alarm by the electronic device 101 may include an operation of outputting an acoustic signal through a speaker (e.g., the speaker 230 of FIGS. 2 to 4).

According to one or more embodiments, outputting the vibration notification and/or the acoustic signal in response to the preset event by the electronic device 101 may be selectively performed based on a state, shape, and/or posture of the electronic device 101. For example, in case that a posture of the electronic device 101 corresponds to a reference posture, the electronic device 101 may output an acoustic signal representing the vibration notification through the speaker 230 in response to the preset event. The reference posture may be related to the posture of the electronic device 101 that reduces the magnitude of the friction sound generated by the vibration notification. The volume of the acoustic signal may be related to a type of the preset event (alarm volume in an exemplary state of FIGS. 5A to 5B).

The reference posture may be related to a direction of the electronic device 101. The reference posture may be related to a direction in which the housing of the electronic device 101 vibrates by the haptic actuator. Referring to FIG. 5A, an exemplary case in which the electronic device 101 is disposed on one surface parallel to the ground such as a table 510 is illustrated. The one surface parallel to the ground may be planar or substantially planar. According to one or more embodiments, the electronic device 101 may identify acceleration (e.g., gravity acceleration) applied to the electronic device 101 based on the IMU sensor (e.g., the IMU sensor 311 of FIG. 3). In one or more examples, the electronic device 101 identifies acceleration based on the three axes (e.g., x-axis, y-axis, and z-axis) illustrated in FIG. 5A. For example, the x-axis may be parallel to a width direction of the front surface of the housing of the electronic device 101, the y-axis may be parallel to the height direction of the front surface of the housing of the electronic device 101, and the z-axis may be parallel to a direction of the front surface (e.g., a direction of the normal vector of the front surface).

According to one or more embodiments, the electronic device 101 may identify whether a posture of the electronic device 101 corresponds to the reference posture based on a direction a vector corresponding to an acceleration identified by the IMU sensor and applied to the electronic device 101. For example, referring to FIG. 5A, since the force applied to the electronic device 101 is gravity, the electronic device 101 may identify a gravity acceleration in the −z axis direction based on the IMU sensor. Based on identifying the gravity acceleration in the −z axis direction, the electronic device 101 may identify a posture of the electronic device 101 disposed on one surface parallel to the ground (e.g., reference posture).

In a state in which the electronic device 101 outputs a vibration notification, vibration of the housing of electronic device 101 by the haptic actuator may occur in different directions depending on a design of the housing and/or location of the haptic actuator in the electronic device 101. Referring to FIG. 5A, when the vibration of the housing by the haptic actuator included in the electronic device 101 occurs along the x-axis or the y-axis, a first sound may be generated due to the housing rubbing the table 510 by the housing. Referring to FIG. when vibration of the housing by the haptic actuator included in the electronic device 101 occurs along the z-axis, a second sound may be generated due to knocking on the table 510 by the housing. For example, a collision caused along the z direction by vibration of the housing by the haptic actuator may cause a sound louder than the housing sliding on the table in the x or y directions. Accordingly, a magnitude of the first sound may be smaller than a magnitude of the second sound.

For example, when the vibration of the housing by the haptic actuator occurs along the x-axis or y-axis, the electronic device 101 may determine that a posture of the electronic device 101 (e.g., the arrangement direction) corresponds to the reference posture in which the electronic device 101 is disposed on one surface parallel to the ground, as shown in FIG. 5A. In response to identifying the posture corresponding to the reference posture, the electronic device 101 may output an acoustic signal representing vibration notification by using the speaker 230. In one or more examples, when the vibration of the housing by the haptic actuator occurs along the z-axis, the electronic device 101 may determine that a posture of the electronic device 101 does not correspond to the reference posture. In response to identifying a posture different from the reference posture, the electronic device 101 may refrain from outputting the acoustic signal and output the vibration notification by using the haptic actuator.

In one or more embodiments, comparing the reference posture of the electronic device 101 with the posture of the electronic device 101 may be performed based on whether a grip on the housing is detected. Referring to FIG. 5B, an exemplary case in which contact between a user's body part 520 (e.g., a hand) and the electronic device 101 occurs is illustrated. According to one or more embodiments, the electronic device 101 may detect the body part 520 by using a grip sensor (e.g., the grip sensor 314 of FIG. 3) and/or a proximity sensor (e.g., the proximity sensor 313 of FIG. 3). For example, the electronic device 101 may detect a grip on the housing of the electronic device 101 by the body part 520 using the grip sensor.

In one or more embodiments, when the electronic device 101 and the body part 520 are in contact with each other, the electronic device 101 may not compare the reference posture with the posture of the electronic device 101. When the electronic device 101 and the body part 520 are in contact with each other (e.g., when a grip on the housing of the electronic device 101 is detected), the electronic device 101 may refrain from outputting an acoustic signal by using the speaker 230. Referring to FIG. 5B, when the electronic device 101 and the body part 520 are in contact with each other, vibration of the housing of the electronic device 101 by the haptic actuator may cause vibration of the body part 520. For example, the vibration of the housing may be directly transmitted to the user. Since the vibration of the housing is directly transmitted to the user, the user may recognize the vibration notification independently of the acoustic signal output by the speaker 230. According to one or more embodiments, the electronic device 101 may output a vibration notification for the preset event by controlling the haptic actuator among the haptic actuators or speakers 230, based on identifying the body part 520 in contact with the electronic device 101.

As described above, according to one or more embodiments, the electronic device 101 may determine whether to output an acoustic signal representing vibration notification through the speaker 230, based on a direction of a vector corresponding to an acceleration applied to the electronic device 101, and/or the body part 520 in contact with the housing of the electronic device 101. For example, when the electronic device 101 is in contact with the body part 520, the user is more likely to recognize the vibration notification and thus, output of an acoustic signal may not be necessary. As described above with reference to the exemplary case of FIG. 5A, the electronic device 101 may compensate for a change in friction sound according to a vibration direction of the housing by the haptic actuator based on the acoustic signal.

Figure 6A:
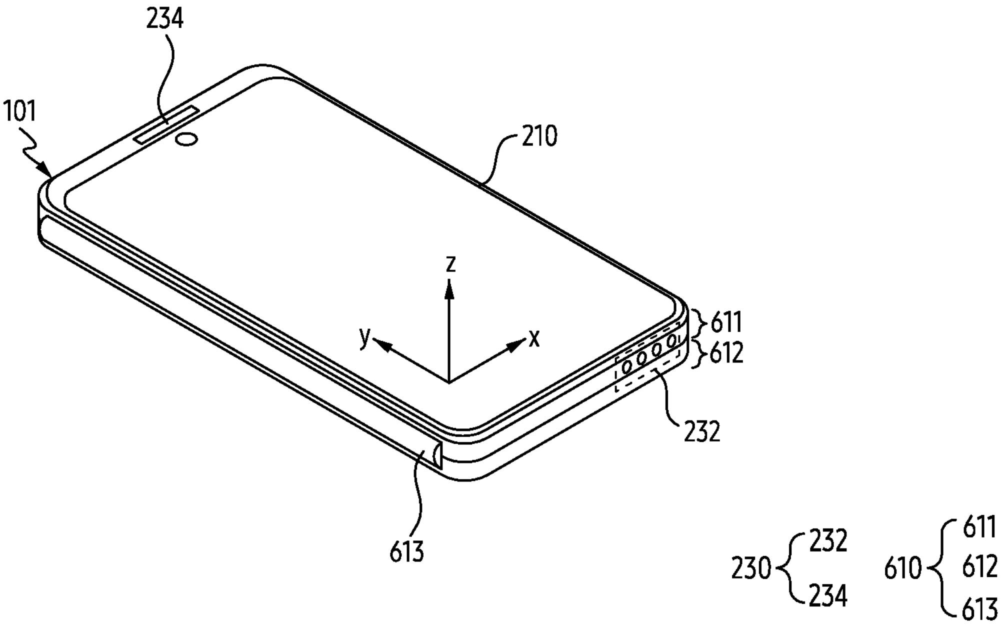
FIGS. 6A to 6C illustrate an example of an operation of identifying whether an electronic device outputs an acoustic signal representing a vibration notification based on a shape of a housing, according to one or more embodiments.
Figure 6B:
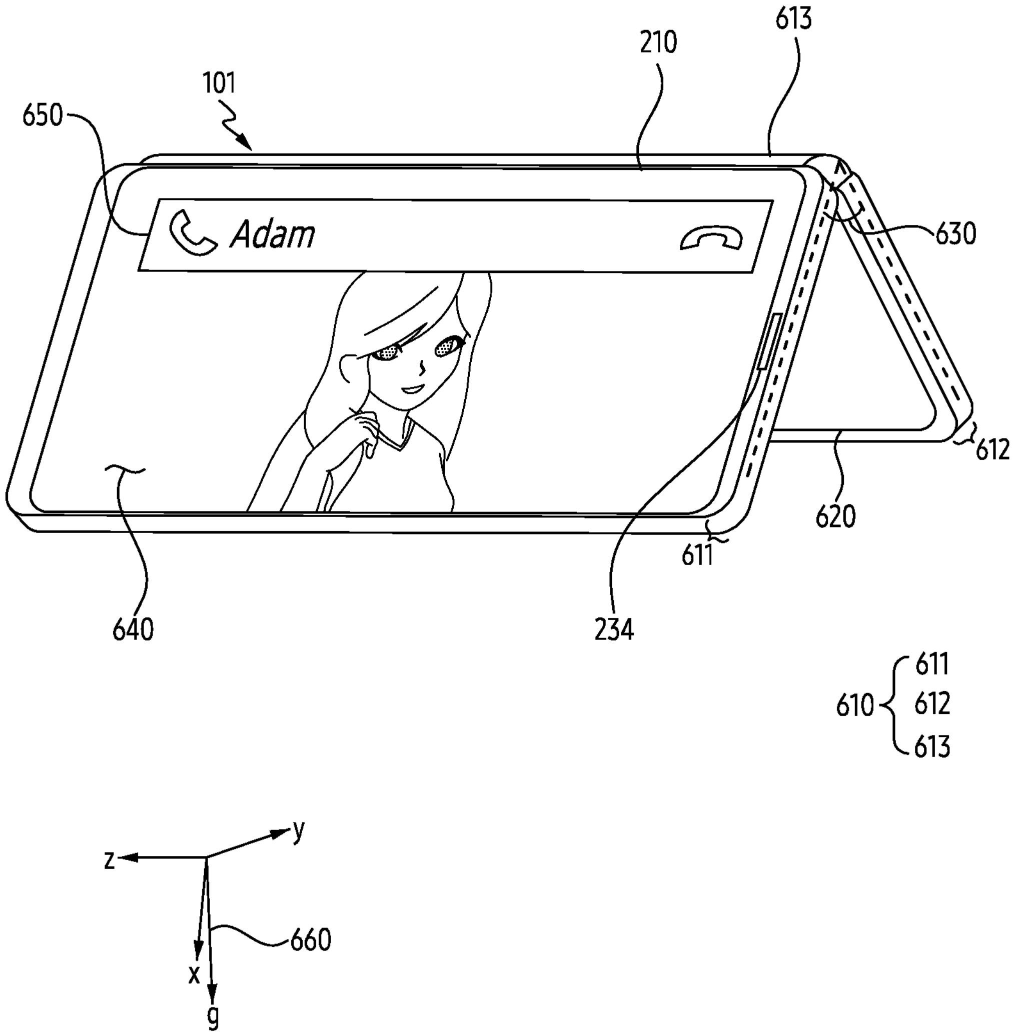
Figure 6C:
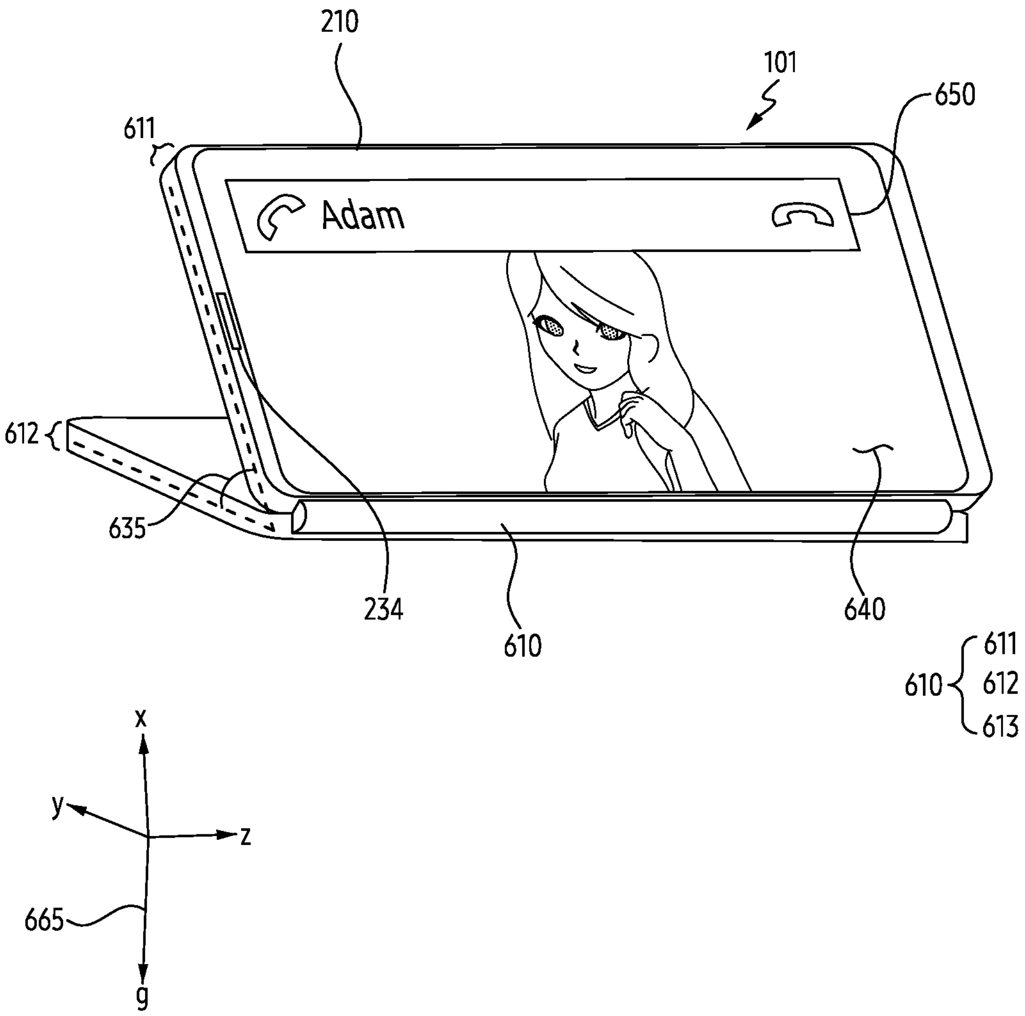

The reference posture for determining whether to output the acoustic signal through the speaker 230 is not limited to the direction of the electronic device 101 described with reference to FIGS. 5A to 5B and/or the contact between the electronic device 101 and the body part 520. For example, the reference posture may include a specific form of a deformable housing of the electronic device 101. Referring to FIGS. 6A to 6C, an example of an operation of the electronic device 101 identifying a posture corresponding to the reference posture will be described, based on one or more embodiments of the electronic device 101 including a foldable housing.

FIGS. 6A to 6C illustrate an example of an operation of identifying whether an electronic device outputs an acoustic signal representing a vibration notification based on a shape of a housing, according to one or more embodiments. The electronic device 101 of FIGS. 6A to 6C may be an example of the electronic device of FIGS. 3 to 4. For example, the electronic device 101, the display 210, and the speaker 230 of FIGS. 6A to 6C may include the electronic device 101, the display 210, and the speaker 230, respectively, of FIG. 3.

According to one or more embodiments, the electronic device 101 may include a deformable housing 610. The housing 610 may include a first sub housing 611, a second sub housing 612, and a hinge assembly 613. The first sub housing 611 may be connected to a first edge of the hinge assembly 613. The second sub housing 612 may be connected to a second edge of the hinge assembly 613 opposite to the first edge. The hinge assembly 613 may be a pivot of the first sub housing 611 and the second sub housing 612. The first sub housing 611 and the second sub housing 612 may be the same size or different sizes. In one or more examples, an angle of the housing 610 may include a small angle (e.g., an internal angle) from a plurality of angles formed by the first sub housing 611, the hinge assembly 613, and the second sub housing 612. In one or more embodiments, the angle of the housing 610 may be adjusted within a range of 0° to 180° by an external force exerted by the housing 610 (e.g., body part 520 applying external pressure).

According to one or more embodiments, the electronic device 101 may include a flexible display 620 disposed across the first sub housing 611 and the second sub housing 612. The flexible display 620 may not be viewable by a user, according to the angle of the housing 610. According to one or more embodiments, the display 210 of the electronic device 101 may be at least partially exposed to the outside through another surface of the first sub housing 611 opposite to one surface of the first sub housing 611 on which the flexible display 620 is formed.

According to one or more embodiments, the electronic device 101 may identify the state, posture, and/or shape of the electronic device 101 based on the angle of the housing 610. For example, the electronic device 101 may identify a posture of the electronic device 101 based on the angle of the housing 610 by using IMU sensors (e.g., the IMU sensor 311 in FIG. 3) and/or a hall sensor (e.g., the hall sensor 315 in FIG. 3) disposed in each of the first sub housing 611 and the second sub housing 612. Identification of the angle of the housing 610 by the electronic device 101 using the IMU sensors and/or the Hall sensor may be periodically performed by a processor (e.g., the processor 120 of FIG. 3) of the electronic device 101. For example, in the active state, the processor may identify the angle of the housing 610 by using all of the IMU sensors and the hall sensor. In another state different from the active state (e.g., inactive state, and/or always-on-display (AOD) state), the processor may identify the angle of the housing 610 from either the IMU sensors or the hall sensors.

According to one or more embodiments, electronic device 101 may identify the state of electronic device 101 based on designated angle ranges formed by dividing the angle of housing 610. The electronic device 101 may selectively identify the state of the electronic device 101 among the designated angle ranges based on the execution of the process (e.g., the sensor manager 426 and/or the window manager) in the framework layer 420 of FIG. 4. For example, a first designated range may be a range including 0° (e.g., a range of 0° or more and 10° or less). A second designated range different from the first designated range may be formed within an angle of 90° or less (e.g., a range of 21° or more and 90° or less). A padding based on hysteresis of the sensor that identifies the angle of the housing 610 (e.g., the sensor 310 such as the IMU sensor 311 and/or the hall sensor 315 of FIG. 3) may be formed between the first designated range and the second designated range (e.g., a range of 11° or more, less than 20°). A third designated range different from the first designated range to the second designated range may be formed within an angle of 90° or more (e.g., a range of 91° or more and 130° or less). A fourth designated range different from the first to third designated range may be a range including 180° (e.g., a range of 131° or more and 180° or less).

According to one or more embodiments, the electronic device 101 may identify a state of the electronic device 101 based on one angle range including the angle of the housing 610 among the designated angle ranges. A folded state and/or a closed state may indicate that the angle of the housing 610 is included within the first designated range. A sub-folded state, a sub-closed state, a tent state, and/or an acute angle state may indicate that the angle of the housing 610 is within the second designated range. A sub-unfolded state, a sub-opened state, and/or the obtuse angle state may indicate that the angle of the housing 610 is included within the third designated range. A unfolded state, an opened state, and/or a straight angle state may indicate that the angle of the housing 610 is within the fourth designated range.

Referring to FIG. 6A, an example of a state of the electronic device 101 in which the angle of the housing 610 is substantially 0° (e.g., 0° to 5°) is illustrated. In the exemplary state of FIG. 6A, the electronic device 101 may identify a state of the electronic device 101 corresponding to the folded state. Referring to FIGS. 6B to 6C, an example of the state of the electronic device 101 in which the angle (e.g., angles 630, 635) of the housing 610 is 60° is illustrated. In the exemplary state of FIGS. 6B to 6C, the electronic device 101 may identify the state of the electronic device 101 corresponding to the sub-folded state and/or the tent state.

According to one or more embodiments, the electronic device 101 may selectively control at least one of the haptic actuator or the speaker 230 based on identifying a state of the electronic device 101 when a request for vibration notification by the haptic actuator (e.g., the haptic actuator 220 in FIG. 2) is received. Selection and/or identification of at least one of the haptic actuator or the speaker 230 by the electronic device 101 may be related to a state of the electronic device 101 identified by the angle of the housing 610. For example, in the fold state including the state of FIG. 6A, as described above with reference to FIGS. 5A to 5B, the electronic device 101 may select and/or identify at least one of the haptic actuator or the speaker 230 based on acceleration applied to the electronic device 101 (e.g., gravity acceleration), and/or an external object in contact with the housing 610 of the electronic device 101 (e.g., the body part 520 in FIG. 5B). The electronic device 101 may output a vibration notification using the haptic actuator and the haptic actuator among the haptic actuator and the speaker 230 based on the selection and/or identification of the haptic actuator. The electronic device 101 may output an acoustic signal representing the vibration notification using the speaker 230 among the haptic actuator and the speaker 230 based on the selection and/or identification of the speaker 230. Based on the selection and/or identification of both of the haptic actuator and the speaker 230, the electronic device 101 may substantially simultaneously output a vibration notification by using the haptic actuator and output the acoustic signal by using the speaker 230. In one or more examples, the output of the vibration notification by the haptic actuator may occur prior to the output of the vibration notification by the speaker 230. In one or more examples, the output of the vibration notification by the speaker 230 may occur prior to the output of the vibration notification by the haptic actuator.

Referring to FIGS. 6B to 6C, a state of the electronic device 101 in the sub-folded state is illustrated. In the sub-folded state of FIGS. 6B to 6C, the electronic device 101 may display a screen 640 in the display 210 among the display 210 and the flexible display 620. The screen 640 may be displayed based on an application (e.g., the application 412 of FIG. 4) executed by the electronic device 101.

In the embodiments of FIGS. 6B to 6C displaying the screen 640 based on the execution of the application, in response to receiving a signal regarding an incoming call, the electronic device 101 may output a vibration notification for notifying the reception of the signal. The electronic device 101 may display a visual object 650 for notifying the reception of the signal by overlapping at least a portion of the screen 640 in the display 210 (e.g., display message "Incoming Call"). The visual object 650 may be displayed based on a system service (e.g., the notification manager 428 in FIG. 4) executed by the electronic device 101. The visual object 650 may include a text indicating the phone number and/or name of the counterpart who requested the call establishment. The visual object 650 may include an icon (e.g., a call button) for establishing a call connection based on the signal. The visual object 650 may include an icon (e.g., a reject button) for refusing to establish a call connection based on the signal. Exemplary cases of FIGS. 6B to 6C in which the visual object 650 is displayed may be cases in which a preset event occurs.

In the exemplary cases of FIGS. 6B to 6C in which a state of the electronic device 101 is a sub-folded state, according to one or more embodiments, the electronic device 101 may select and/or identify hardware to be controlled in response to the preset event, based on the direction of a vector corresponding to an acceleration applied to the electronic device 101 (e.g., gravity accelerations 660, 665), or whether a grip on the housing 610 is detected, among the haptic actuator or the speaker 230. For example, when a grip on the housing 610 is detected, the electronic device 101 may refrain from outputting an acoustic signal representing a vibration notification by using the speaker 230, and may output a vibration notification by using the haptic actuator since in this situation, the user is likely to identify the vibration notification by the haptic actuator based on the grip of the housing. When the grip on the housing 610 is released, the electronic device 101 may determine whether to output the acoustic signal together with the output of the vibration notification by the haptic actuator, based on a state of the electronic device 101 distinguished by the angle of the housing 610, and/or the direction of the vector corresponding to the acceleration applied to the electronic device 101. According to one or more embodiments, the electronic device 101 may output the acoustic signal based on identifying that a posture of the electronic device 101 corresponds to the reference posture based on the designated angle range (e.g., at least one of the designated angle ranges).

Referring to FIG. 6B, an exemplary case in which the angle 630 of the housing 610 is 60°, and the electronic device 101 is stood by one edge of the first sub housing 611 and one edge of the second sub housing 612 is illustrated. In the exemplary case of FIG. 6B, when a haptic actuator is disposed within the first sub housing 611 and the direction of vibration of the first sub housing 611 by the haptic actuator occurs along the y-axis and/or z-axis of FIG. 6B, a relatively small sound may be generated by the vibration of the first sub housing 611. In the exemplary case of FIG. 6B, when a haptic actuator is disposed within the first sub housing 611 and the direction of vibration of the first sub housing 611 by the haptic actuator occurs along the x-axis of FIG. 6B, a relatively loud sound (e.g., collision between one edge of the first sub housing 611 and the ground) may be generated by the vibration of the first sub housing 611.

For example, when the vibration of the first sub housing 611 by the haptic actuator disposed within the first sub housing 611 occurs along the y-axis and/or z-axis of the first sub housing 611, the electronic device 101 may identify a posture of the electronic device 101 based on the direction of the gravity acceleration 660. In one or more examples, the reference posture may include a posture in which the electronic device 101 is stood by one edge of the first sub housing 611 and one edge of the second sub housing 612. In one or more examples, based on identifying a posture of the electronic device 101 corresponding to the reference posture, the electronic device 101 according to one or more embodiments may control the speaker 230 to output an acoustic signal representing a vibration notification. In one or more examples, although the vibration occurring along the y-axis and/or z-axis of the first sub housing 611 generates a relatively small sound, the electronic device 101 may notify the user that a preset event is occurred based on the acoustic signal.

Referring to FIG. 6C, an exemplary case in which the angle 635 of the housing 610 is 60° and the second sub housing 612 of the electronic device 101 is disposed toward the ground is illustrated. In the exemplary case of FIG. 6C, when the haptic actuator is disposed in the first sub housing 611, and the vibration direction of the first sub housing 611 by the haptic actuator corresponds to the y-axis of FIG. 6C, a relatively small sound may be generated by vibration of the first sub housing 611. In the exemplary case of FIG. 6C, when the vibration direction of the first sub housing 611 by the haptic actuator disposed in the first sub housing 611 corresponds the x-axis and/or z-axis of FIG. 6C, a relatively loud sound (e.g., collision between the second sub housing 612 and the ground) may be generated by the vibration of the first sub housing 611.

For example, when the vibration of the first sub housing 611 by the haptic actuator disposed in the first sub housing 611 occurs along the y-axis of the first sub housing 611, the electronic device 101 may identify a posture of the electronic device 101 based on the direction of a vector corresponding to the gravity acceleration 665. In the exemplary case of FIG. 6C, the direction the vector corresponding to the gravity acceleration 665 may be parallel to the direction of one surface of the second sub housing 612. In one or more examples, the reference posture may include a posture in which the electronic device 101 is held up by one surface of the second sub housing 612. In one or more examples, according to one or more embodiments, based on identifying a posture of the electronic device 101 corresponding to the reference posture, the electronic device 101 may control the speaker 230 to output an acoustic signal representing a vibration notification. In one or more examples, although the vibration occurred along the y-axis of the first sub housing 611 generates a relatively small sound, the electronic device 101 may notify the user that a preset event has occurred based on the acoustic signal.

As described above, the electronic device 101 including the foldable housing 610 may identify the angle of the housing 610 together with the direction of a vector corresponding to the acceleration applied to the electronic device 101 (e.g., gravity accelerations 660, 665) and/or the grip on the housing 610. Based on the direction, the grip, and/or the angle, the electronic device 101 may select and/or identify hardware (e.g., haptic actuator or speaker 230) to be controlled by a preset event. For example, the electronic device 101 may activate the speaker 230 based on a determination that the posture of the electronic device 101 is the reference posture described above with reference to FIGS. 6A to 6C. By playing an acoustic signal representing a vibration notification by using the activated speaker 230, the electronic device 101 may compensate for the low magnitude of friction sound generated by vibration of the housing 610 by the haptic actuator.

Figure 7A:
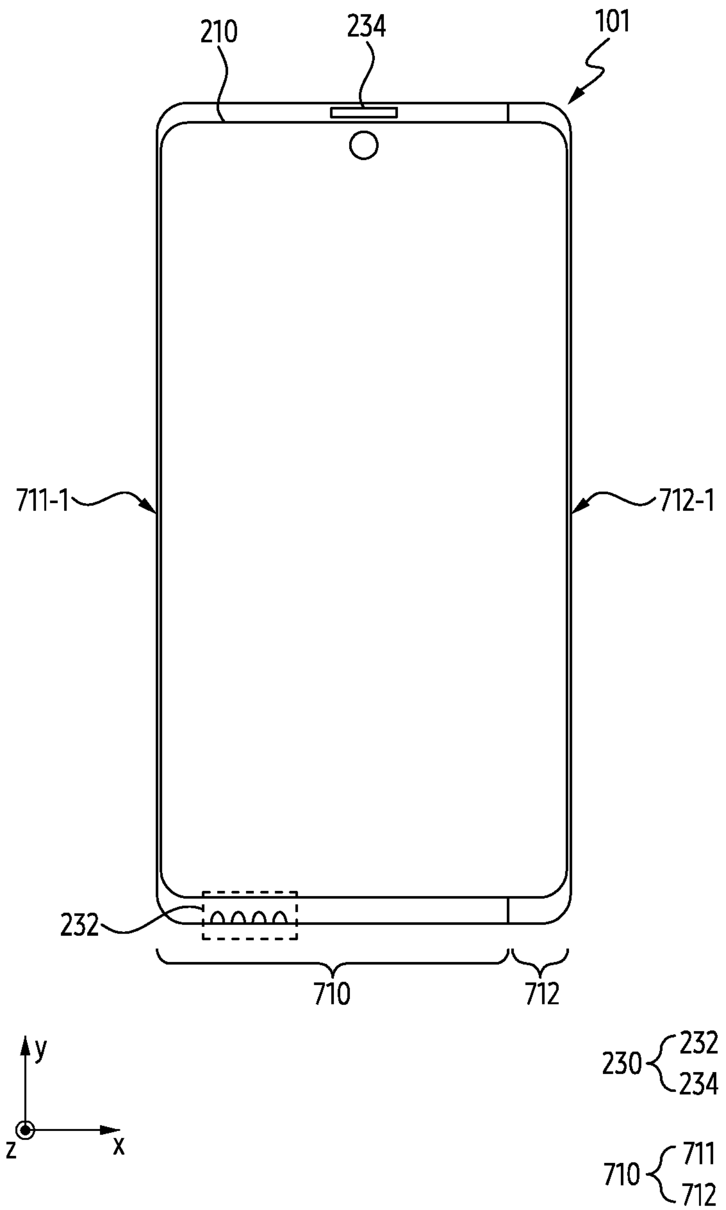
FIGS. 7A to 7B illustrate an example of an operation of identifying whether an electronic device outputs an acoustic signal representing a vibration notification based on a shape of a housing, according to one or more embodiments.
Figure 7B:
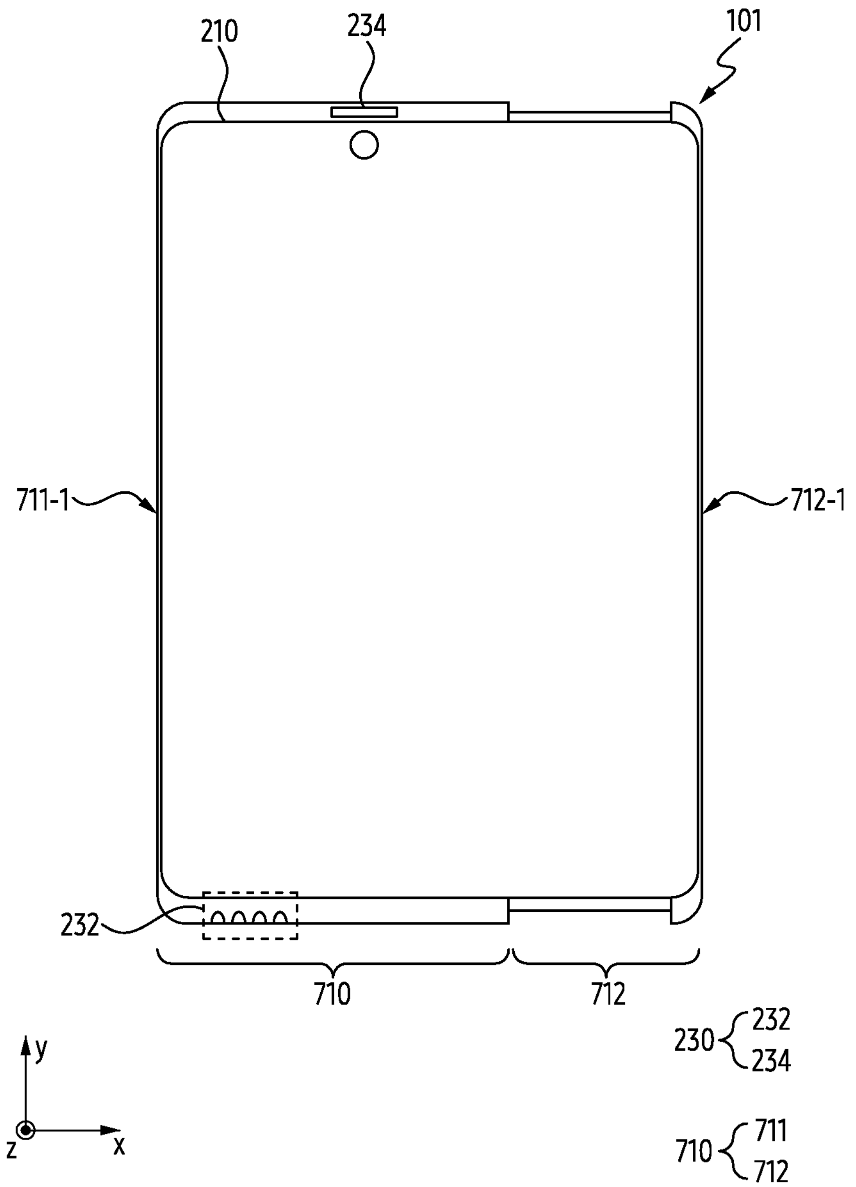

Referring to FIGS. 7A to 7B, an example of an operation of the electronic device 101 identifying a posture corresponding to the reference posture will be described, based on one or more embodiments of the electronic device 101 including a slidable housing.

FIGS. 7A to 7B illustrate an example of an operation of identifying whether an electronic device outputs an acoustic signal representing a vibration notification based on a shape of a housing, according to one or more embodiments. The electronic device 101 of FIGS. 7A to 7B may be an example of the electronic device of FIGS. 3 to 4. For example, the electronic device 101, the display 210, and the speaker 230 of FIGS. 7A to 7B may include the electronic device 101, the display 210, and the speaker 230, respectively, of FIG. 3.

According to one or more embodiments, the electronic device 101 may include a deformable housing 710. The housing 710 may include a first sub housing 711 and a second sub housing 712. The first sub housing 711 of the housing 710 may be slidably coupled to the second sub housing 712. According to one or more embodiments, the electronic device 101 may include a sliding actuator for inserting the second sub housing 712 into the first sub housing 711 or extracting the second sub housing 712 from the first sub housing 711 along the x axis. According to one or more embodiments, the display 210 of the electronic device 101 may be disposed across the first sub housing 711 and the second sub housing 712. In one or more examples, the electronic device 101 may include a sliding actuator for inserting the second sub housing 712 into the first sub housing 711 or extracting the second sub housing 712 from the first sub housing 711 along the y axis.

According to one or more embodiments, the electronic device 101 may adjust the shape of the electronic device 101 based on the insertion or extraction of the second sub housing 712 to the first sub housing 711. Referring to FIGS. 7A to 7B, one or more embodiments in which the electronic device 101 is deformed along the x-axis direction (e.g., a width direction among the width direction and a height direction of the electronic device 101) is illustrated. For example, the second sub housing 712 may be inserted into the first sub housing 711 along the x-axis direction of FIGS. 7A to 7B, or may be extracted from the first sub housing 711. Referring to FIG. 7A, as the second sub housing 712 is inserted into the first sub housing 711, the volume of the housing 710 is minimized. In the state of the electronic device 101 illustrated in FIG. 7A, a distance between the edge 711-1 of the first sub housing 711 and the edge 712-1) of the second sub housing 712 may be minimized. The state of the electronic device 101 illustrated in FIG. 7A in which the distance between the edges 711-1 and 712-1 is minimized may be referred to as a roll-in state and/or a slide-in state. Referring to FIG. 7B, as the second sub housing 712 is extracted from the first sub housing 711, the volume of the housing 710 is maximized. In the state of FIG. 7B, the distance between the edge 711-1 of the first sub housing 711 and the edge 712-1 of the second sub housing 712 may be maximized. The state of FIG. 7B in which the distance between the edges 711-1 and 712-1 is maximized may be referred to as a roll-out state and/or a slide-out state. A state in which a distance between the edges 711-1 and 712-1 is greater than a first distance in the slide-in state and less than a second distance in the slide-out state may be referred to as a sub-rolled state and/or an intermediate state.

Referring to FIGS. 7A to 7B, the size of one surface of the display 210 exposed to the outside may be adjusted by insertion or extraction of the second sub housing 712 with respect to the first sub housing 711. At least a portion of the display 210 exposed to the outside may be referred to a display area. For example, by insertion of the second sub housing 712 into the first sub housing 711, at least a portion of the display 210 may be inserted into the first sub housing 711. For example, by extraction of the second sub housing 712 to the first sub housing 711, at least a portion of the display 210 may be extracted from the first sub housing 711. In the slide-in state of FIG. 7A, the size and/or area of the display area may be minimized. In the slide-out state of FIG. 7B, the size and/or area of the display area may be maximized.

In one or more embodiments of FIGS. 7A to 7B in which the first sub housing 711 is slidably coupled to the second sub housing 712, the volume of a cavity formed by the housing 710 may depend on a shape of the electronic device 101. For example, in the roll-in state, since the second sub housing 712 is inserted into the first sub housing 711, the volume of the cavity may be minimized. For example, in the roll-out state, the volume of the cavity may be maximized by the second sub housing 712 extracted from the first sub housing 711.

According to one or more embodiments, the electronic device 101 may select and/or identify at least one hardware to be controlled based on the vibration notification, among a haptic actuator (e.g., the haptic actuator 220 in FIG. 2) and the speaker 230, in response to the occurrence of the preset event to provide vibration notification. In one or more embodiments of FIGS. 7A to 7B, the selection and/or identification of at least one hardware by the electronic device 101 may depend on the shape of the electronic device 101 and/or the volume of capacity, identified by the insertion or extraction of the second sub housing 712 to the first sub housing 711.

In one or more embodiments in which the haptic actuator is disposed in cavity of the housing 710, the vibration generated by the haptic actuator may cause vibration of other hardware and/or circuits disposed in the cavity of housing 710. For example, as the volume of the cavity decreases, the density of hardware and circuits disposed in the cavity may increase. Increasing the density may promote vibration of the hardware and the circuit. For example, as the volume of the cavity increases, the magnitude of the friction sound generated by vibration based on the haptic actuator may decrease and therefore, becomes less noticeable. As the magnitude of the friction sound decreases, the probability that the user recognizes the friction sound may decrease. For example, as the volume of the cavity increases, the probability that the user recognizes the friction sound may decrease.

According to one or more embodiments, in the roll-out state such as the state of FIG. 7B, the electronic device 101 may output an acoustic signal representing vibration notification by using the speaker 230. As described above, in the roll-out state in which the volume of cavity of housing 710 is maximized, the probability that the friction sound generated by the haptic actuator is recognized by the user may be reduced. In order to compensate for the reduced probability that the vibration generated by the haptic actuator is noticed, the electronic device 101 may output the acoustic signal by using the speaker 230. Outputting an acoustic signal for the preset event by the electronic device 101 using the speaker 230 may be related to the roll-out state and the intermediate state. For example, based on identifying the distance between the edges 711-1 and 712-1 exceeding a designated threshold, the electronic device 101 may output the acoustic signal. In one or more embodiments, outputting an acoustic signal based on identifying the distance between the edges 711-1 and 712-1 exceeds a designated threshold may be performed independently of the direction of a vector corresponding to the acceleration (e.g., gravity acceleration) applied to the electronic device 101.

According to one or more embodiments, in the roll-in state as in the state of FIG. 7A, the electronic device 101 may select and/or identify hardware to output a vibration notification in response to the preset event, among the haptic actuator or the speaker 230, as described above with reference to FIGS. 5A to 5B. For example, based on identifying the distance between the edges 711-1 and 712-1 below the designated threshold, the electronic device 101 may identify whether the posture of the electronic device 101 corresponds to the reference posture. In one or more examples, in response to identifying the posture corresponding to the reference posture, the electronic device 101 may output an acoustic signal related to the vibration notification through the speaker 230 in response to the preset event.

As described above, according to one or more embodiments, the electronic device 101 may determine whether to output an acoustic signal representing a vibration notification, based on at least one of the contact between the electronic device 101 and the external object (e.g., the body part 520 of FIG. 5B), the shape of the electronic device 101, or the posture of the electronic device 101. Determining whether the electronic device 101 outputs the acoustic signal is not limited to the above described embodiment. For example, the electronic device 101 may determine whether to output the acoustic signal, based on identifying external electronic devices (e.g., wireless earbuds, head mounted display (HMD), and/or smart watch) connected to the electronic device 101, and/or earphone connected by wire to the electronic device 101. For example, when the earphone and/or the wireless earbud are connected to the electronic device 101, the electronic device 101 may transmit an acoustic signal representing vibration notification to the earphone and/or the wireless earbud, independently of the generation of vibrations based on the haptic actuator.

Figure 8:
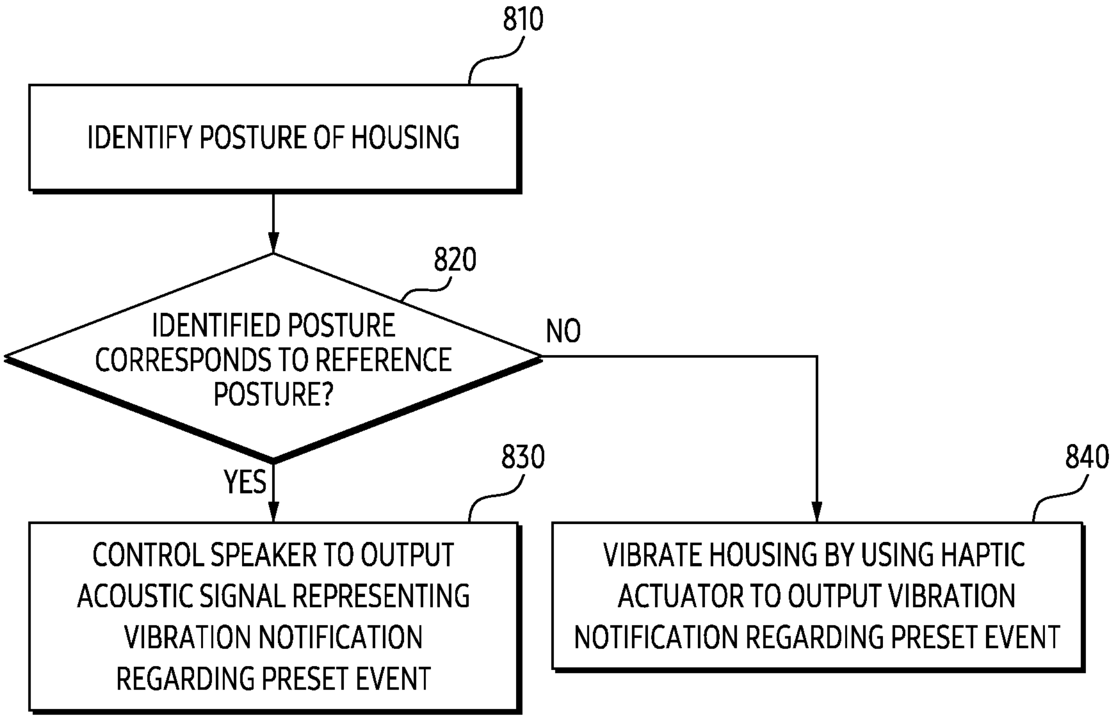
FIG. 8 illustrates an example of a flowchart for describing an operation of an electronic device, according to one or more embodiments.

FIG. 8 illustrates an example of a flowchart for describing an operation of an electronic device, according to one or more embodiments. The electronic device of FIG. 8 may be an example of the electronic device of FIGS. 1 to 4, the electronic device 101 of FIGS. 5A to 5B, FIGS. 6A to 6C, and/or FIGS. 7A to 7B. For example, at least one of the operations of FIG. 8 may be performed by the electronic device 101 and/or the processor 120 of FIG. 3.

Referring to FIG. 8, in operation 810, according to one or more embodiments, the electronic device may identify a posture of the housing (e.g., the housing 610 of FIGS. 6A to 6C, and/or the housing 710 of FIGS. 7A to 7B). The electronic device may identify a posture of the housing based on execution of the sensor manager 426 and/or the window manager of FIG. 4. Identifying the posture of the electronic device may include an operation of identifying a direction of the electronic device based on acceleration applied to the electronic device. Identifying the posture of the electronic device may include an operation of identifying an angle of the housing described above with reference to FIGS. 6A to 6C. Identifying the posture of the electronic device may include an operation of identifying a shape of the housing described above with reference to FIGS. 7A to 7C.

Referring to FIG. 8, in operation 820, according to one or more embodiments, the electronic device may determine whether the identified posture corresponds to the reference posture. The reference posture may include a posture in which vibration generated by the haptic actuator (e.g., the haptic actuator 220 of FIG. 3) included in the electronic device is unlikely to be recognized by the user. The reference posture may depend on the vibration direction of the housing by the haptic actuator. In one or more embodiments, the electronic device may determine whether a direction of the electronic device identified based on operation 810 corresponds to the reference direction for representing a vibration notification for the event preset using a speaker.

According to one or more embodiments, in response to identifying a posture different from the reference posture (820-NO), the electronic device may vibrate the housing by using the haptic actuator to output the vibration notification for the preset event in operation 840. For example, the electronic device may respond to the preset event, by using the haptic actuator among the haptic actuator and the speaker (e.g., the speaker 230 of FIGS. 2 to 3). In one or more examples, when a direction different from the reference direction is identified based on operation 810, the electronic device may refrain from outputting the acoustic signal through the speaker, and may output the vibration notification by vibrating the housing using the haptic actuator.

According to one or more embodiments, in response to identifying the posture corresponding to the reference posture (820-YES), the electronic device may control the speaker to output the acoustic signal representing the vibration notification for the preset event in operation 830. For example, the electronic device may respond to the preset event by controlling both of the haptic actuator and the speaker. For example, the electronic device may respond to the preset event by controlling the speaker. The acoustic signal may be played based on a volume set by a type of the preset event (e.g., different preset events are associated with different volumes). In a state of outputting the acoustic signal based on operation 830, the electronic device may cease outputting the acoustic signal in response to completion of the preset event. In a state of outputting the acoustic signal based on operation 830, the electronic device may cease outputting the acoustic signal based on identifying that the posture of the electronic device is changed to another posture different from the reference posture. For example, when identifying a direction corresponding to the reference direction, the electronic device may output the acoustic signal representing the vibration notification for the preset event through the speaker.

Figure 9:
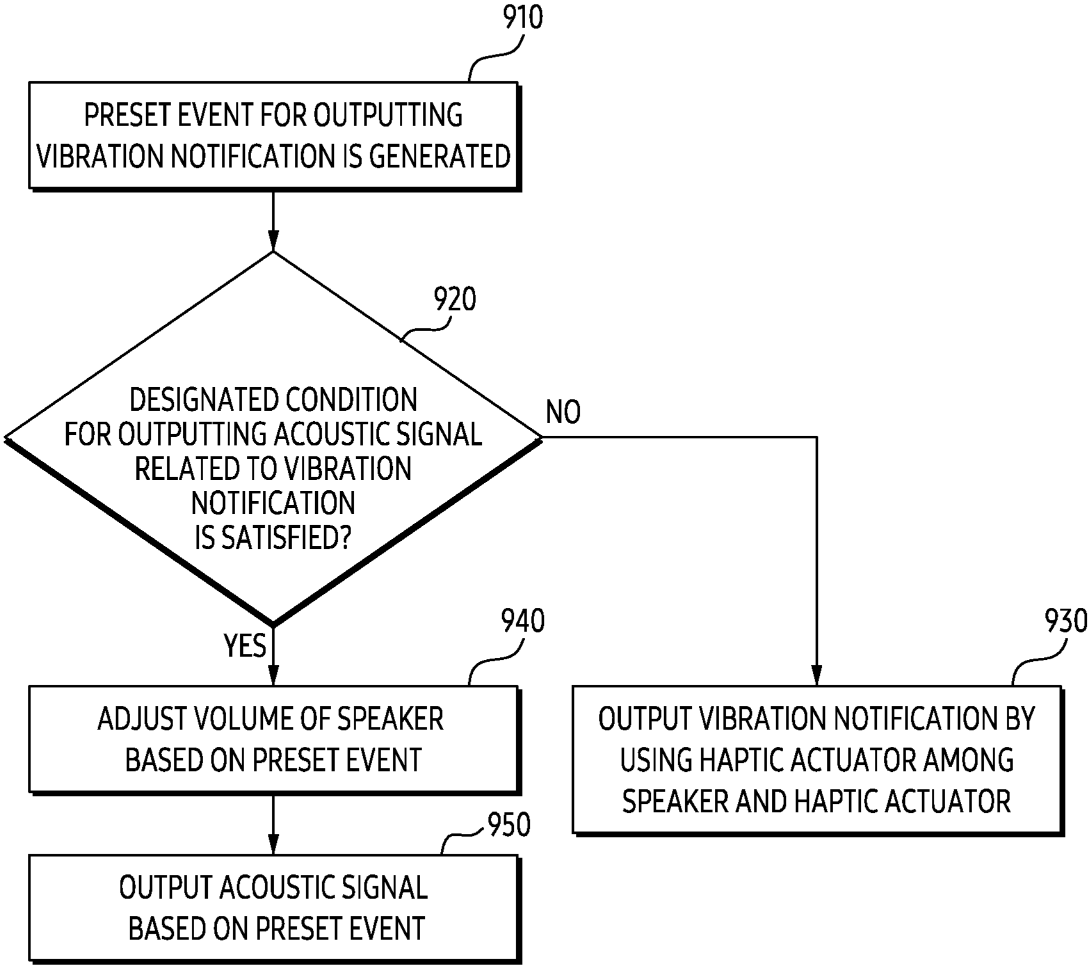
FIG. 9 illustrates an example of a flowchart for describing an operation of an electronic device, according to one or more embodiments.

FIG. 9 illustrates an example of a flowchart for describing an operation of an electronic device, according to one or more embodiments. The electronic device of FIG. 9 may be an example of the electronic device of FIGS. 1 to 8. For example, at least one of the operations of FIG. 9 may be performed by the electronic device 101 of FIG. 3 and/or the processor 120. At least one of the operations of FIG. 9 may be related to at least one of the operations of FIG. 8.

Referring to FIG. 9, according to one or more embodiments, a preset event for outputting a vibration notification based on the electronic device may be generated in operation 910. The preset event may be generated based on a call of the designated API by the application 412 and/or the notification manager 428 of FIG. 4.

Referring to FIG. 9, according to one or more embodiments, in operation 920, the electronic device may identify whether the designated condition for outputting the acoustic signal related to the vibration notification is satisfied. The designated condition may include a designated state for controlling the speaker (e.g., the speaker 230 of FIGS. 2 to 3) of the electronic device based on the preset event of operation 910. The designated condition may be related to a grip on an electronic device, a state, a shape, and/or a posture of the electronic device. For example, the designated condition may relate to a state, a shape, and/or a posture of an electronic device where the vibration notification output based on the haptic actuator is relatively unlikely to be recognized by a user.

According to one or more embodiments, in response to identifying that the designated conditions are not satisfied (920-NO), in operation 930, the electronic device may output a vibration notification by using the haptic actuator among the speaker and the haptic actuator. When the designated condition is not satisfied, the electronic device may be in a state in which the vibration notification output based on the haptic actuator is highly likely to be recognized by the user. The electronic device may vibrate the housing of the electronic device using the haptic actuator to output the vibration notification. The intensity, number of repetitions, and/or period of the vibration notification may be determined based on a type of the preset event.

According to one or more embodiments, in response to identifying that the designated condition is satisfied (920-YES), in operation 940, the electronic device may adjust the volume of the speaker based on the preset event. The volume of the speaker may be adjusted by a type of preset event. For example, the volume of the speaker may be adjusted to a volume independent of the volume used to play media content. The media content may be played simultaneously with the output of an acoustic signal.

Referring to FIG. 9, according to one or more embodiments, the electronic device may output an acoustic signal based on the preset event in operation 950. For example, the electronic device may output the acoustic signal based on a volume adjusted based on operation 940. Outputting the acoustic signal based on operation 950 by the electronic device may be performed substantially simultaneously with outputting the vibration notification based on the haptic actuator.

In one or more embodiments, the condition in operation 920 is indicated by reference information. The electronic device may obtain, based on the preset event of the operation 910 (e.g., a preset event for outputting a vibration notification), information indicating at least one of direction of posture of the electronic device from the sensor. The electronic device may identify, based on the obtained information and the reference information corresponding to the condition, whether to control the speaker. For example, the electronic device may identify, based on the obtained information and reference information associated with a magnitude of friction sound based on controlling of the haptic actuator, whether to control the speaker. The electronic device may control, based on identification whether to control the speaker, the speaker to output an acoustic signal associated with the friction sound while the haptic actuator is controlled based on the vibration notification.

Figure 10:
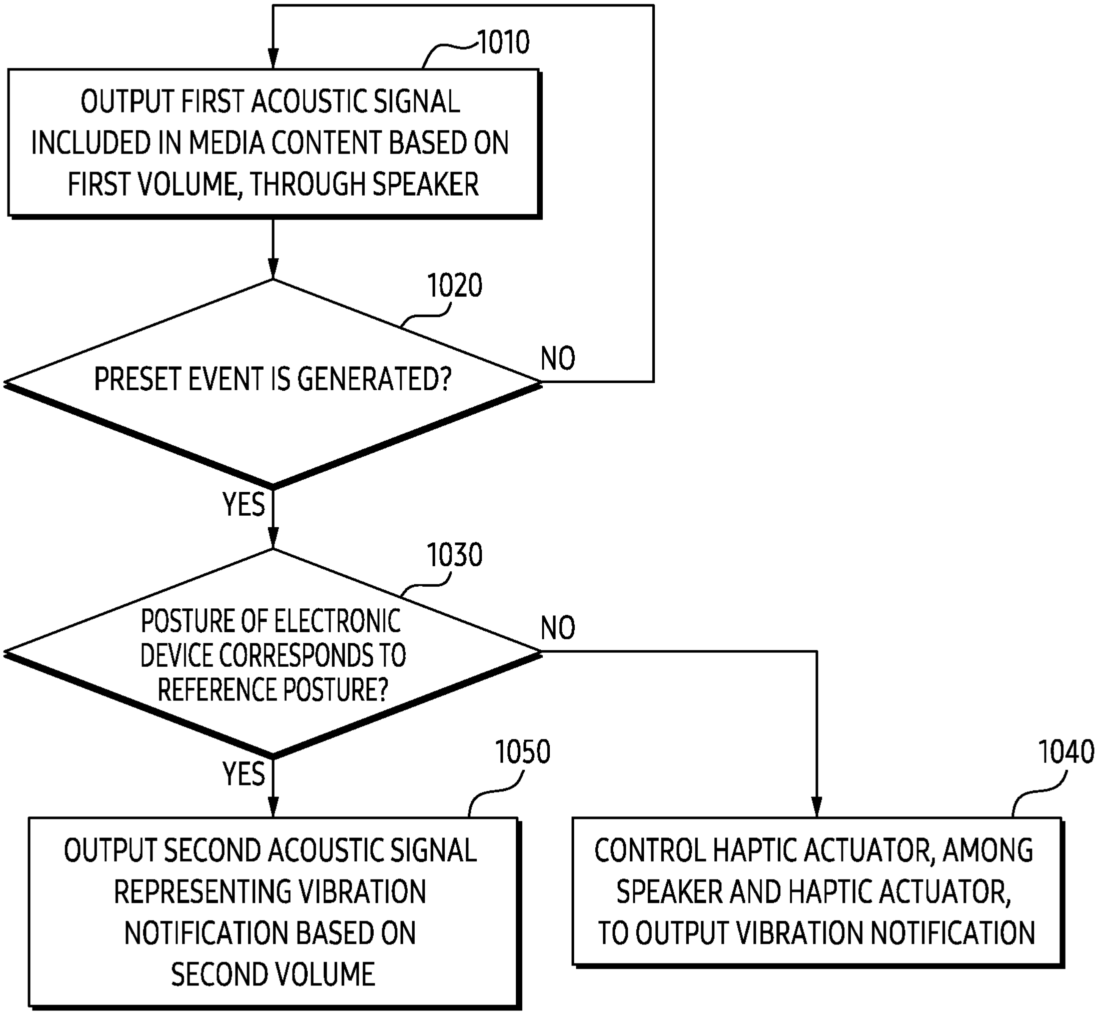
FIG. 10 illustrates an example of a flowchart for describing an operation of an electronic device, according to one or more embodiments.

FIG. 10 illustrates an example of a flowchart for describing an operation of an electronic device, according to one or more embodiments. The electronic device of FIG. 10 may be an example of the electronic device of FIGS. 1 to 9. For example, at least one of operations of FIG. 10 may be performed by the electronic device 101 and/or the processor 120 of FIG. 3. At least one of operations of FIG. 10 may be related to at least one of the operations of FIGS. 8 to 9.

Referring to FIG. 10, according to one or more embodiments, the electronic device may output a first acoustic signal included in the media content at a first volume through the speaker, in operation 1010. For example, the electronic device may play the media content based on a first application for playing one or more media contents. The one or more media contents may include video and/or audio. The first volume may be used to adjust the amplitude, and/or the maximum value of the magnitude, and/or the average value of the first acoustic signal.

Referring to FIG. 10, according to one or more embodiments, the electronic device may determine whether a preset event is generated in operation 1020. The preset event may be generated together with information for generating vibration notification. The preset event may be generated based on a second application executed by the electronic device and different from the first application. Before the preset event is generated (1020-NO), the electronic device may output the first acoustic signal based on operation 1010.

When a preset event occurs (1020-YES), according to one or more embodiments, the electronic device may determine whether a posture of the electronic device corresponds to the reference posture in operation 1030. The reference posture may be set based on a probability that vibration generated by the haptic actuator (e.g., the haptic actuator 220 of FIGS. 2 to 3) in the electronic device is recognized by the user. The preset event of operation 1030 may correspond to the preset event of operations 830 and 840 of FIG. 8 and operation 910 of FIG. 9. The posture of the electronic device may be identified based on a sensor (e.g., the sensor 310 of FIG. 3) included in the electronic device.

In one or more embodiments where the electronic device includes a foldable housing (e.g., the housing 610 of FIGS. 6A to 6C), the electronic device may determine whether the posture of the electronic device corresponds to the reference posture based on the angle at which the housing is folded. For example, based on whether the angle is included within the designated angle range (e.g., the second designated angle range described above with reference to FIGS. 7A to 7B) for the reference posture, the electronic device may determine whether the posture of the electronic device corresponds to the reference posture.

In one or more embodiments where the electronic device includes a slidable housing (e.g., the housing 710 of FIGS. 7A to 7B), the electronic device may identify a distance between one surface (e.g., one surface including the edges 711-1 of FIGS. 7A to 7B) of the first sub housing (e.g., the first sub housing 711 of FIGS. 7A to 7B) of the housing and one surface (e.g., one surface including the edges 712-1 of FIGS. 7A to 7B) of the second sub housing (e.g., the second sub housing 712 of FIGS. 7A to 7B) that is slidably coupled to the first sub housing. The electronic device may determine whether the posture of the electronic device corresponds to the reference posture based on whether the identified distance is included within the designated distance range corresponding to the reference posture. The designated distance range may be a distance range including a distance between one surface of the first housing and one surface of the second housing in a roll-out state.

According to one or more embodiments, when the posture of the electronic device does not correspond to the reference posture (1030-NO), in operation 1040, the electronic device may control the haptic actuator, among the speaker and the haptic actuators, to output a vibration notification. An operation of outputting the vibration notification based on operation 1040 may be performed similarly to operation 930 of FIG. 9.

According to one or more embodiments, when the posture of the electronic device corresponds to the reference posture (1030-YES), in operation 1050, the electronic device may output a second acoustic signal representing a vibration notification at a second volume. The second volume may be identified by a parameter related to the preset event. In one or more examples, the second volume may be set independently of the first volume in operation 1010. While outputting the second acoustic signal based on operation 1050, the electronic device may at least temporarily cease outputting the first acoustic signal based on operation 1010. After the output of the second acoustic signal based on operation 1050 is completed, the output of the first acoustic signal based on operation 1010 may be resumed. In one or more examples, the second acoustic signal is output at the second volume simultaneously with the first acoustic signal where the second volume is higher than the first volume. In one or more examples, when the second acoustic signal is simultaneously with the first acoustic signal, the first volume at which the first acoustic signal is outputted may be temporarily reduced while the second acoustic signal is outputted at the second volume. When a grip on the electronic device is detected, the electronic device may refrain from outputting the second acoustic signal using a speaker, independently of whether the posture of the electronic device corresponds to the reference posture. An operation in which the electronic device outputs the second acoustic signal based on operation 1050 may be performed similarly to operations 940 and 950 of FIG. 9.

As described above, according to one or more embodiments, the electronic device may activate the speaker based on a condition set based on a probability that vibration generated by the haptic actuator is recognized. The conditions may be related to an external object in contact with the electronic device, the posture, shape, and/or state of the electronic device. When the speaker is activated based on the conditions, the electronic device may output an acoustic signal representing vibration generated by the haptic actuator. Based on the acoustic signal, the electronic device may notify the user of the occurrence of the preset event that causes the vibration, independently of the decrease in the probability.

Based on whether the user may recognize the vibration generated from the electronic device, a method for generating the vibration by the electronic device may be required.

As described above, according to one or more embodiments, an electronic device (e.g., the electronic device 101 of FIG. 1) may comprise a haptic actuator (e.g., the haptic actuator 220 of FIG. 2), a speaker (e.g., the speaker 230 of FIG. 2), a sensor (e.g., the sensor 310 of FIG. 3), and a processor (e.g., the processor 120 of FIG. 2). The processor may be configured to identify a direction of the electronic device by using the sensor. The processor may be configured to output, through the speaker based on identifying the direction corresponding to a reference direction for representing vibration notification regarding a preset event, an acoustic signal represents the vibration notification regarding the preset event. The processor may be configured to refrain from, based on identifying the direction different from the reference direction, outputting the acoustic signal through the speaker, and output the vibration notification regarding the preset event by vibrating a housing of the electronic device by using the haptic actuator.

For example, the processor may be configured to output, while outputting the acoustic signal based on identifying the direction corresponding to the reference direction, the vibration notification by using the haptic actuator.

For example, the processor may be configured to output, based on a volume corresponding to a type of the preset event, the acoustic signal.

For example, the processor may be configured to identifying whether the direction identified by using the sensor is corresponding to the reference direction associated with a direction in which the housing of the electronic device is vibrated by the haptic actuator.

For example, the electronic device may further comprise a hinge assembly (e.g., the hinge assembly 613 of FIGS. 6A to 6C), the housing including a first sub housing (e.g., the first sub housing 611 of FIGS. 6A to 6C) coupled to a first edge of the hinge assembly, and a second sub housing (e.g., the second sub housing 612 of FIGS. 6A to 6C) coupled to a second edge of the hinge assembly opposite to the first edge. The processor may be configured to identify, based on identifying that an angle (e.g., the angles 630, 635 of FIGS.

6B to 6C) between the first sub housing, the hinge assembly, and the second sub housing identified by using the sensor is included in a preset range, that a posture of the housing indicated by the angle is corresponding to a reference posture.

For example, the electronic device may comprise the housing including a first sub housing (e.g., the first sub housing 711 of FIGS. 7A to 7B), and a second sub housing 712 (e.g., the second sub housing 712 of FIGS. 7A to 7B) slidably coupled to the first sub housing. The processor may be configured to identify, based on identifying that a distance between a surface of the first sub housing and a surface of the second housing opposite from the surface of the first sub housing identified by using the sensor, that a posture of the housing indicated by the distance is corresponding to a reference posture.

For example, the processor may be configured to output, in a state identifying a grip on the housing of the electronic device by using the sensor, the acoustic signal through the speaker independently of whether the direction is corresponding to the reference direction.

For example, the processor may be configured to refrain from, based on the direction corresponding to the reference direction, providing vibration notification regarding the preset event through the haptic actuator.

As described above, according to one or more embodiments, a method of an electronic device may comprise outputting (e.g., operation 1010 of FIG. 10), through a speaker of the electronic device based on a first volume, a first acoustic signal included in a media content. The method may include identifying, based on identifying occurrence of the preset event while outputting the first acoustic signal, a posture of the housing by using the sensor. The method may include outputting (e.g., operation 1050 of FIG. 10), based on identifying the posture corresponding to a reference posture, a second acoustic signal representing a vibration notification regarding the preset event based on a second volume different from the first volume through the speaker. The method may include outputting (e.g., operation 1040 of FIG. 10), based on identifying the posture different from the reference posture, the vibration notification by controlling a haptic actuator in the electronic device in a state outputting the first acoustic signal based on the first volume.

For example, outputting the second acoustic signal may comprise outputting the vibration notification by controlling the haptic actuator.

For example, the outputting the second acoustic signal may comprise identifying, based on information indicating the posture identified from a sensor in the electronic device, an angle in which a housing of the electronic device is folded. The outputting the second acoustic signal may comprise identifying whether the identified angle is included in a preset angle regarding the reference posture.

For example, the outputting the second acoustic signal may comprise identifying a distance between a surface of a first sub housing of a housing of the electronic device and a surface of a second sub housing slidably coupled to the first sub housing, wherein the distance is identified from a sensor in the electronic device. The outputting the second acoustic signal may comprise identifying whether the identified distance is included in a preset range regarding the reference posture.

For example, the outputting the vibration notification may comprise refraining from outputting the second acoustic signal by using the speaker.

For example, the outputting the second acoustic signal may comprise outputting, based on the second volume indicated by a type of the preset event, the second acoustic signal.

For example, the method may further comprise refraining from, based on identifying a grip on a housing of the electronic device based on a grip sensor of the electronic device, outputting the second acoustic signal independently of identifying the posture corresponding to the reference posture.

As described above, according to one or more embodiments, a method of an electronic device may comprise identifying (e.g., operation 810 of FIG. 8) a direction of the electronic device by using a sensor included in the electronic device. The method may include outputting (e.g., operation 830 of FIG. 8), based on identifying the direction corresponding to a reference direction for representing vibration notification regarding a preset event by using the sensor, an acoustic signal representing the vibration notification regarding the preset event through a speaker in the electronic device. The method may include refraining from, based on identifying the direction different from the reference direction, outputting the acoustic signal through the speaker, and outputting (e.g., operation 840 of FIG. 8) the vibration notification regarding the preset event by vibrating the housing by using a haptic actuator in the electronic device.

For example, the outputting the acoustic signal may comprise outputting, while outputting the acoustic signal based on identifying the direction corresponding to the reference direction, the vibration notification by using the haptic actuator.

For example, the outputting the acoustic signal may comprise outputting, based on a volume corresponding to a type of a preset event, the acoustic signal.

For example, the identifying may comprise identifying whether the direction identified by using the sensor is corresponding to the reference direction associated with a direction in which a housing of the electronic device is vibrated by the haptic actuator.

For example, the identifying may comprise identifying, based on identifying that an angle between a hinge assembly of a housing of the electronic device, a first sub housing coupled to a first edge of the hinge assembly, and a second sub housing coupled to a second edge of the hinge assembly is included in a preset range and is identified by using the sensor, that a posture of the electronic device indicated by the angle is corresponding to the reference posture.

For example, the method may comprise refraining from, outputting the acoustic signal independently of whether the direction is corresponding to the reference direction in a state detecting a grip on the housing by using the sensor.

As described above, according to one or more embodiments, an electronic device (e.g., the electronic device 101 of FIGS. 2 to 3) may comprise a housing (e.g., the housing 610 of FIGS. 6A to 6C, and/or the housing 710 of FIGS. 7A to 7B), a haptic actuator (e.g., the haptic actuator 220 in FIG. 2), a speaker (e.g., the speaker 230 in FIG. 2), a sensor (e.g., the sensor 310 in FIG. 3), and a processor (e.g., the processor 120 in FIG. 2). The processor may be configured to output, through the speaker based on a first volume, a first acoustic signal included in a media content. The processor may be configured to identify, based on identifying occurrence of the preset event while outputting the first acoustic signal, a posture of the housing by using the sensor. The processor may be configured to output, based on identifying the posture corresponding to a reference posture, a second acoustic signal representing a vibration notification regarding the preset event based on a second volume different from the first volume through the speaker. The processor may be configured to output, based on identifying the posture different from the reference posture, the vibration notification by controlling the haptic actuator in a state outputting the first acoustic signal based on the first volume.

For example, the processor may be configured to output, in another state outputting the second acoustic signal, the vibration notification by controlling the haptic actuator.

For example, the processor may be configured to identify, based on information indicating the posture and is identified from the sensor, an angle in which the housing is folded. The processor may be configured to identify, whether the identified angle is included in a preset range regarding the preset posture.

For example, the housing may include a first sub housing (e.g., the first sub housing 711 of FIGS. 7A to 7B), and a second sub housing (e.g., the second sub housing 712 of FIGS. 7A to 7B) slidably coupled to the first sub housing. The processor may be configured to identify, by using the sensor, a distance between a surface of the first sub housing and a surface of the second sub housing opposite to the surface of the first sub housing. The processor may be configured to identify, whether the identified distance is included in a preset range regarding the reference posture.

For example, the processor may be configured to output, based on the second volume indicated by a type of the preset event, the second acoustic signal.

For example, the electronic device may further comprise a grip sensor (e.g., the grip sensor 314 of FIG. 3) for detecting a grip on the housing. The processor may be configured to refrain from, based on detecting a grip on the housing based on the grip sensor, outputting the second acoustic signal independently of identifying the posture corresponding to the reference posture.

As described above, according to one or more embodiments, the electronic device (e.g., the electronic device 101 of FIGS. 2 to 3) may comprise a haptic actuator (e.g., the haptic actuator 220 in FIG. 2), a speaker (e.g., the speaker 230 in FIG. 2), a sensor (e.g., the sensor 310 in FIG. 3), and a processor (e.g., the processor 120 in FIG. 2). The processor may be configured to, based on a preset event for outputting a vibration notification, obtain information indicating at least one of direction of posture of the electronic device from the sensor. The processor may be configured to, based on the obtained information and reference information associated with a magnitude of friction sound based on controlling of the haptic actuator, identify whether to control the speaker. The processor may be configured to, based on identification whether to control the speaker, controlling the speaker to output an acoustic signal associated with the friction sound while the haptic actuator is controlled based on the vibration notification.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although certain embodiments have been described above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims to be described later.

What is claimed is:

1. An electronic device comprising:

a housing;

a haptic actuator;

a speaker;

a sensor:

memory comprising one or more storage media storing instructions; and at least one processor, wherein the instructions, when executed by the at least one processor, cause the electronic device to:

identify an occurrence of preset event;

identify, based on identification of the occurrence of the preset event, a direction of the electronic device by using the sensor;

determine whether the direction of the electronic device corresponds to a reference direction associated with a direction in which the housing of the electronic device is vibrated by the haptic actuator;

based on determining that the direction of the electronic device responds to the reference direction, output, through the speaker, an acoustic signal that represents vibration notification regarding the preset event; and based on determining that the direction of the electronic device does not correspond to the reference direction, refrain from outputting the acoustic signal through the speaker, and control the haptic actuator to output the vibration notification regarding the preset event by vibrating the housing of the electronic device.

2. The electronic device of claim 1, wherein the instructions, when executed by the at least one processor, cause the electronic device to:

while the acoustic signal is output though the speaker based on the direction corresponding to the reference direction, control the haptic actuator to output the vibration notification by using the haptic actuator.

3. The electronic device of claim 1, wherein the instructions, when executed by the at least one processor, cause the electronic device to:

output, through the speaker, the acoustic signal at a volume corresponding to a type of the preset event.

4. The electronic device of claim 1, further comprising a hinge assembly, wherein the housing comprises a first sub housing coupled to a first edge of the hinge assembly, and a second sub housing coupled to a second edge of the hinge assembly opposite to the first edge, and wherein the instructions, when executed by the at least one processor individually or collectively, cause the electronic device to:

identify an angle between the first sub housing, the hinge assembly, and the second sub housing by using the sensor; and based on the angle between the first sub housing, the hinge assembly, and the second sub housing being within a preset range, identify that a posture of the housing indicated by the angle corresponds to a reference posture.

5. The electronic device of claim 1, wherein the housing comprises a first sub housing, and a second sub housing slidably coupled to the first sub housing, and wherein the instructions, when executed by the at least one processor individually or collectively, cause the electronic device to:

identify a distance between a surface of the first sub housing and a surface of the second sub housing opposite from the surface of the first sub housing; and based on the distance being less than or equal to a threshold, identify that a posture of the housing indicated by the distance corresponds to a reference posture.

6. The electronic device of claim 1, wherein the instructions, when executed by the at least one processor individually or collectively, cause the electronic device to:

based on a grip on the housing of the electronic device being detected by using the sensor, the outputting the acoustic signal through the speaker regardless of whether the direction corresponds to the reference direction.

7. The electronic device of claim 1, wherein the instructions, when executed by the at least one processor, cause the electronic device to:

refrain, based on the direction corresponding to the reference direction, from providing the vibration notification regarding the preset event through the haptic actuator.

8. The electronic device according to claim 1, wherein the instructions, when executed by the at least one processor, further cause the electronic device to:

based on determining that the direction of the electronic device corresponds to the reference direction, control the haptic actuator to output the vibration notification and further control the speaker to output a friction sound that was caused by the haptic actuator to output the vibration notification.

9. A method of an electronic device, the method comprising:

outputting, through a speaker of the electronic device at a first volume, a first acoustic signal included in a media content;

based on an occurrence of a preset event while outputting the first acoustic signal, identifying a posture of a housing of the electronic device by using a sensor of the electronic device;

determining whether the posture of the housing of the electronic device corresponds to a reference posture associated with a direction in which the housing of the electronic device is vibrated by a haptic actuator;

based on determining that the posture of the housing of the electronic device corresponds to the reference posture, outputting, through the speaker, a second acoustic signal representing a vibration notification regarding the preset event at a second volume different from the first volume; and based on determining that the posture of the housing of the electronic device does not correspond to the reference posture, outputting the vibration notification by controlling the haptic actuator of the electronic device while outputting the first acoustic signal based on the first volume.

10. The method of claim 9, wherein the outputting the second acoustic signal comprises:

outputting the vibration notification by controlling the haptic actuator.

11. The method of claim 9, wherein the outputting the second acoustic signal comprises:

identifying, based on information indicating the posture identified using the sensor in the electronic device, an angle in which the housing of the electronic device is folded; and identifying whether the angle is within a preset range regarding the reference posture.

12. The method of claim 9, wherein the outputting the second acoustic signal comprises:

identifying a distance between a surface of a first sub housing of the housing of the electronic device and a surface of a second sub housing slidably coupled to the first sub housing, wherein the distance is identified by using the sensor in the electronic device; and identifying whether the distance is included within a preset range regarding the reference posture.

13. The method of claim 9, wherein the outputting the vibration notification comprises:

refraining from outputting the second acoustic signal through the speaker.

14. The method of claim 9, wherein the second volume corresponds to a type of the preset event.

15. The method of claim 9, further comprising:

based on a grip on the housing of the electronic device being detected using a grip sensor of the electronic device, refraining from outputting the second acoustic signal regardless of whether the posture corresponds to the reference posture.

16. A method of an electronic device, the method comprising:

identifying an occurrence of a preset event;

identifying, based on identification of the occurrence of the preset event, a direction of the electronic device by using a sensor of the electronic device;

determine whether the direction of the electronic device corresponds to a reference direction associated with a direction in which a housing of the electronic device is vibrated by a haptic actuator;

based on determining that the direction of the electronic device corresponds to the reference direction, outputting an acoustic signal representing a vibration notification regarding the preset event through a speaker in the electronic device; and based on determining that the direction of the electronic device does not correspond to the reference direction, refraining from outputting the acoustic signal through the speaker, and outputting the vibration notification regarding the preset event by vibrating the housing of the electronic device by using the haptic actuator.

17. The method of claim 16, wherein the outputting the acoustic signal comprises:

while outputting the acoustic signal based on the direction corresponding to the reference direction, outputting, the vibration notification by using the haptic actuator.

18. The method of claim 16, wherein the outputting the acoustic signal comprises:

outputting the acoustic signal at a volume corresponding to a type of the preset event.

19. The method of claim 16, wherein the identifying comprises:

based on an angle, identified by using the sensor, between a hinge assembly of the housing of the electronic device, a first sub housing coupled to a first edge of the hinge assembly, and a second sub housing coupled to a second edge of the hinge assembly being within a preset range, identifying that a posture of the electronic device indicated by the angle corresponds to a reference posture.

* * * * *